US011294898B2

(12) United States Patent
Ahmad et al.

(10) Patent No.: US 11,294,898 B2
(45) Date of Patent: Apr. 5, 2022

(54) SYSTEM AND METHOD OF AUTOMATED ASSESSMENT GENERATION

(71) Applicant: Pearson Education, Inc., New York, NY (US)

(72) Inventors: Zakariya Ahmad, San Francisco, CA (US); Ryan Andrew Downey, Menlo Park, CA (US)

(73) Assignee: PEARSON EDUCATION, INC., New York, NY (US)

( * ) Notice: Subject to any disclaimer, the term of this patent is extended or adjusted under 35 U.S.C. 154(b) by 1238 days.

(21) Appl. No.: 15/665,093

(22) Filed: Jul. 31, 2017

(65) Prior Publication Data

US 2019/0036775 A1     Jan. 31, 2019

(51) Int. Cl.
*G06F 16/2453* (2019.01)
*G06F 16/332* (2019.01)
*H04L 29/08* (2006.01)
*H04L 67/306* (2022.01)

(52) U.S. Cl.
CPC .. *G06F 16/24534* (2019.01); *G06F 16/24542* (2019.01); *G06F 16/24547* (2019.01); *G06F 16/3326* (2019.01); *H04L 67/306* (2013.01)

(58) Field of Classification Search
CPC ......... G06F 16/24534; G06F 16/24547; G06F 16/24542; G06F 16/3326
USPC ....................................................... 707/713
See application file for complete search history.

(56) References Cited

U.S. PATENT DOCUMENTS

| | | | | |
|---|---|---|---|---|
| 5,692,906 A | * | 12/1997 | Corder | G06Q 20/042 434/156 |
| 6,032,141 A | * | 2/2000 | O'Connor | G09B 7/04 434/107 |
| 6,067,537 A | * | 5/2000 | O'Connor | G06Q 20/102 434/118 |
| 6,125,358 A | * | 9/2000 | Hubbell | G09B 7/04 434/307 R |
| 6,651,121 B1 | | 11/2003 | Zurawski et al. | |
| 6,658,398 B1 | * | 12/2003 | Bertrand | G06F 9/453 706/47 |
| 6,782,374 B2 | * | 8/2004 | Nichols | G09B 7/04 706/15 |
| 6,938,258 B1 | | 8/2005 | Weinberger et al. | |
| 7,168,084 B1 | * | 1/2007 | Hendricks | H04N 21/4344 725/42 |
| 7,386,524 B2 | * | 6/2008 | Hubbell | G09B 5/06 706/11 |

(Continued)

*Primary Examiner* — Mark E Hershley
(74) *Attorney, Agent, or Firm* — Quarles & Brady LLP

(57) ABSTRACT

Systems and methods for automated content provisioning to a user device are disclosed herein. The system can include a memory including a user profile database containing information relating to a plurality of users and a content library database including a plurality of data packets. The system can include at least one server and a user device. The user device can: receive a request for content receipt; send an electrical signal containing a content request to the server; send an electrical signal containing hardware configuration data to the server; receive first data packets; launch evaluation software; evaluate received response data with the launched evaluation software; generate outcome data for a plurality of attributes of the received response data; and automatically deliver second presentation data received in second data packets.

18 Claims, 13 Drawing Sheets

(56) References Cited

U.S. PATENT DOCUMENTS

| | | | |
|---|---|---|---|
| 7,640,160 B2* | 12/2009 | Di Cristo | G10L 15/22 704/257 |
| 7,757,175 B2 | 7/2010 | Miller | |
| 7,813,822 B1* | 10/2010 | Hoffberg | H04N 21/44222 700/94 |
| 8,214,877 B1 | 7/2012 | Grimes et al. | |
| 8,499,088 B1 | 7/2013 | Breau et al. | |
| 8,620,659 B2* | 12/2013 | Di Cristo | G10L 15/22 704/257 |
| 8,751,634 B2 | 6/2014 | Julia et al. | |
| 9,183,258 B1 | 11/2015 | Taylor et al. | |
| 9,367,214 B2 | 7/2016 | Gupta et al. | |
| 9,489,236 B2 | 11/2016 | Kishan et al. | |
| 9,740,769 B2* | 8/2017 | Bhagwat | G06F 16/248 |
| 9,904,579 B2* | 2/2018 | Shear | G06F 9/50 |
| 9,916,519 B2 | 3/2018 | Rodriguez et al. | |
| 10,061,839 B2 | 8/2018 | O'Malley | |
| 10,136,191 B1 | 11/2018 | Lewis et al. | |
| 10,361,802 B1* | 7/2019 | Hoffberg-Borghesani | G11B 27/11 |
| 10,516,691 B2* | 12/2019 | York | H04L 67/10 |
| 2002/0138590 A1* | 9/2002 | Beams | G09B 7/00 709/218 |
| 2005/0102351 A1 | 5/2005 | Jiang et al. | |
| 2005/0132227 A1 | 6/2005 | Reasor et al. | |
| 2008/0222280 A1* | 9/2008 | Lippincott | H04L 41/00 709/223 |
| 2010/0088332 A1 | 4/2010 | Nussel et al. | |
| 2010/0281355 A1* | 11/2010 | White | G06Q 30/02 715/222 |
| 2010/0293058 A1 | 11/2010 | Maher et al. | |
| 2011/0212717 A1* | 9/2011 | Rhoads | G06F 16/9554 455/420 |
| 2012/0173512 A1* | 7/2012 | Burkey | G06F 16/335 707/713 |
| 2012/0215684 A1 | 8/2012 | Kidron | |
| 2013/0167039 A1 | 6/2013 | Howell et al. | |
| 2014/0080428 A1* | 3/2014 | Rhoads | G06F 16/5838 455/88 |
| 2014/0149492 A1* | 5/2014 | Ananthanarayanan | G06F 9/5072 709/203 |
| 2014/0215617 A1 | 7/2014 | Smith et al. | |
| 2014/0272911 A1 | 9/2014 | York et al. | |
| 2014/0325586 A1 | 10/2014 | Halliday et al. | |
| 2015/0013008 A1 | 1/2015 | Lukacs et al. | |
| 2015/0050998 A1 | 2/2015 | Stelovsky et al. | |
| 2015/0160806 A1 | 6/2015 | Fey et al. | |
| 2015/0163242 A1* | 6/2015 | Laidlaw | H04L 63/1433 726/22 |
| 2015/0220949 A1 | 8/2015 | Pinsley et al. | |
| 2015/0293746 A1 | 10/2015 | Tsern | |
| 2015/0324811 A1 | 11/2015 | Courtright et al. | |
| 2015/0350204 A1 | 12/2015 | Wang et al. | |
| 2016/0143570 A1 | 5/2016 | Valacich et al. | |
| 2016/0292423 A1 | 10/2016 | Yao et al. | |
| 2016/0328548 A1 | 11/2016 | Gross | |
| 2016/0358495 A1* | 12/2016 | Bushell | G09B 7/06 |
| 2017/0039876 A1 | 2/2017 | Alyuz Civitci et al. | |
| 2017/0050111 A1 | 2/2017 | Perry et al. | |
| 2017/0053299 A1 | 2/2017 | Rozga et al. | |
| 2017/0083624 A1 | 3/2017 | Scapa | |
| 2017/0084197 A1* | 3/2017 | Crouse | G09B 7/00 |
| 2017/0155662 A1 | 6/2017 | Courbon et al. | |
| 2017/0169715 A1 | 6/2017 | Alyuz Civitci et al. | |
| 2017/0188926 A1 | 7/2017 | Oobayashi | |
| 2018/0018540 A1 | 1/2018 | Hazur et al. | |
| 2018/0041815 A1 | 2/2018 | Bayer et al. | |
| 2018/0089131 A1 | 3/2018 | Burns et al. | |
| 2018/0176156 A1* | 6/2018 | Downey | H04L 51/04 |
| 2018/0225325 A1* | 8/2018 | Ghosh | G06F 16/2379 |

* cited by examiner

SYSTEM AND METHOD OF AUTOMATED ASSESSMENT GENERATION

BACKGROUND

A computer network or data network is a telecommunications network that allows computers to exchange data. In computer networks, networked computing devices exchange data with each other along network links (data connections). The connections between nodes are established using either cable media or wireless media. The best-known computer network is the Internet.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other.

Computer networks differ in the transmission media used to carry their signals, the communications protocols to organize network traffic, the network's size, topology, and organizational intent. In most cases, communications protocols are layered on (i.e. work using) other more specific or more general communications protocols, except for the physical layer that directly deals with the transmission media.

Notifications can be sent through a computer network. These notifications can be electronic notifications and can be received via e-mail, phone, text message, or fax. Notifications have many applications for businesses, governments, schools, and individuals.

BRIEF SUMMARY

One aspect of the present disclosure relates to a system for providing content to a user via a user device. In some embodiments, the content is matched to a hardware configuration of the user device. The system includes a memory including: a user profile database containing information relating to a plurality of users, which information relating to the plurality of users identifies attributes of the plurality of users; and a content library database containing a plurality of data packets for providing to a user. The system includes at least one server and a user device. The user device includes: a network interface that can exchange data via a communication network; and an input/output subsystem that can convert electrical signals to user interpretable outputs via a user interface. The user device can: receive a request for content receipt; send an electrical signal comprising a content request to the server, which content request includes a user identifier and a device identifier; send an electrical signal including hardware configuration data to the server, which hardware configuration data identifies at least one hardware based capability of the user device and at least one network capability of the user device; receive first data packets including presentation data and evaluation data via electrical signals transmitted via the communication network, which evaluation data includes evaluation software and evaluation criteria; and launch the evaluation software. In some embodiments, the user device can: evaluate received response data with the launched evaluation software; generate outcome data for a plurality of attributes of the received response data; and automatically deliver second presentation data received in second data packets, which second data packets are selected based on the plurality of attributes of the received response.

In some embodiments, the at least one hardware based capability identifies the ability of the user device to record sound data via a microphone. In some embodiments, the at least one network capability of the user device identifies at least one of an upload speed and a download speed of the communication network. In some embodiments, the user device further includes a communications subsystem. In some embodiments, the user device can generate the electrical signal comprising the content request via the communications subsystem.

In some embodiments, the user device can generate the electrical signal including the hardware configuration data via a communications subsystem of the user device. In some embodiments, the user device can provide the presentation data of the received first data packets to the user via the input/output subsystem. In some embodiments, the user device can the outcome data to the server. In some embodiments, the outcome data identifies a result of the evaluation of the received response data. In some embodiments, the first data packets are selected based on the hardware configuration data, and the hardware configuration data includes the at least one hardware based capability. In some embodiments, the hardware configuration data includes the at least one hardware based capability and the at least one of an upload speed and a download speed of the communication network.

One aspect of the present disclosure relates to a method of providing content to a user via a user device, which content is matched to a hardware configuration of the user device. The method includes: requesting content from a server; sending hardware configuration data to the server, the hardware configuration data identifying at least one hardware based capability and at least one network capability of the user device; receiving first data packets including presentation data and evaluation data, the evaluation data including evaluation software and evaluation criteria; evaluating received response data at the user device with the evaluation software; generating outcome data for a plurality of attributes of the response data; and automatically delivering second presentation data selected based on the plurality of attributes of the received response.

In some embodiments, the method includes: receiving a request for content receipt from a user at the user device via an input/output subsystem; and sending an electrical signal including a content request to a server via a communication network, which content request includes a user identifier and a device identifier. In some embodiments, the method includes launching the evaluation software on the user device. In some embodiments, the second presentation data are selected by a recommendation engine.

In some embodiments, the at least one hardware based capability identifies the ability of the user device to record sound data via a microphone. In some embodiments, the at least one network capability of the user device identifies at least one of an upload speed and a download speed of the communication network. In some embodiments, the method includes: generating the electrical signal including the content request via a communications subsystem of the user device; and generating the electrical signal including the hardware configuration data via a communications subsystem of the user device.

In some embodiments, the method includes: providing the presentation data of the received first data packets to the user via an input/output subsystem of the user device; and sending the outcome data to the server via the communication network. In some embodiments, the outcome data identifies a result of the evaluation of the received response data. In some embodiments, the first data packets are selected based on the hardware configuration data. In some embodiments, the hardware configuration data includes the at least one hardware based capability. In some embodiments, the hardware configuration data includes the at least one hardware based capability and the at least one of an upload speed and a download speed of the communication network. In some embodiments, the method includes: generating second outcome data from a response received subsequent to the delivering of the second presentation data; and sending the second outcome data to the server via the communication network.

One aspect of the present disclosure relates to a system for automated content selection and presentation. The system includes a memory including: a user profile database including information relating to a plurality of users, which information relating to the plurality of users identifies attributes of the plurality of users; and a content library database including a plurality of data packets for providing to a user. The system can include at least one server and a user device. The user device can include: a network interface that can exchange data via a communication network; and an input/output subsystem that can convert electrical signals to user interpretable outputs via a user interface. The user device can: launch an evaluation application including foreground portions and background portions, which foreground portions include a user interface that can deliver content to a user and receive inputs from the user; receive an electronic communication from the at least one server, which electronic communication includes at least one data packet including: presentation content configured for delivery to the user; and evaluation content, wherein the evaluation content includes: evaluation software that can automatically receive and evaluate a user response; and evaluation data including criteria for evaluation of the user response. The user device can: receive a user response via the input/output subsystem; automatically trigger the launch of the evaluation software, which evaluation software is launched in the background; automatically generate outcome data for the received response with the evaluation software, which outcome data characterizes at least one user attribute based on the received response; automatically transmit the outcome data to the server; and receive a next electronic communication at the user device.

In some embodiments, the background portions are secured from the foreground portions such that only approved data can flow between the foreground portions and the background portions. In some embodiments, the user device can to segregate the presentation content from the evaluation content. In some embodiments, segregating the presentation content from the evaluation content includes storing the evaluation content on a user inaccessible database of the user device. In some embodiments, segregating the presentation content from the evaluation content further includes encrypting the evaluation data. In some embodiments, the electronic communication includes a plurality of data packets. In some embodiments, the electronic communication includes a first portion including the presentation content and a second portion including the evaluation content.

In some embodiments, the first portion of the electronic communication is received by the user device before receipt of the second portion of the electronic communication. In some embodiments, the user device can provide the presentation content to the user via the foreground portions of the evaluation application operating in the input/output subsystem, which presentation content is provided to the user before receipt of all of a second subset of the plurality of data packets by the user device.

In some embodiments, the response includes a speech stream. In some embodiments, automatically generating outcome data includes: detecting phones within the speech stream; building a transcript of recognized speech based on the detected phones; and applying a scoring model to the transcript. In some embodiments, the output of the scoring model applied to the transcript is the outcome data. In some embodiments, a phone can be at least one distinct physical or perceptual property.

One aspect of the present disclosure relates to a method of automated content selection and presentation. The method includes: launching an evaluation application including foreground portions and background portions, which foreground portions include a user interface that can deliver content to a user and receive inputs from the user; and receiving an electronic communication at a user device from a server including a recommendation engine. In some embodiments, the electronic communication include at least one data packet including: presentation content configured for delivery to a user of the user device; and evaluation content. In some embodiments, the evaluation content includes: evaluation software that can automatically receive and evaluate a user response; and evaluation data, which evaluation data includes criteria for evaluation of the user response. The method includes: receiving a user response from the user at the user device; automatically triggering the launch of the evaluation software, which evaluation software is launched in the background; automatically generating outcome data for the received response with the evaluation software, which outcome data characterizes at least one user attribute based on the received response; automatically transmitting the outcome data to the server; and receiving a next electronic communication at the user device from the server.

In some embodiments, the background portions are secured from the foreground portions such that only approved data can flow between the foreground portions and the background portions. In some embodiments, the method includes segregating the presentation content from the evaluation content. In some embodiments, segregating the presentation content from the evaluation content includes storing the evaluation content on a user inaccessible database of the user device. In some embodiments, segregating the presentation content from the evaluation content further includes encrypting the evaluation data.

In some embodiments, the electronic communication includes a plurality of data packets. In some embodiments, the electronic communication includes a first portion including the presentation content and a second portion including the evaluation content. In some embodiments, the first portion is received by the user device before receipt of the second portion.

In some embodiments, the method includes providing the presentation content to the user via the foreground portions of the evaluation application operating in an input/output subsystem of the user device, which presentation content is provided to the user before receipt of all of a second subset of the plurality of data packets by the user device. In some embodiments, the response includes a speech stream. In some embodiments, automatically generating outcome data includes: detecting phones within the speech stream; building a transcript of recognized speech based on the detected phones; and applying a scoring model to the transcript. In some embodiments, a phone can be at least one distinct physical or perceptual property. In some embodiments, an output of the scoring model applied to the transcript is the outcome data.

One aspect of the present disclosure relates to a system for automated assessment generation. The system includes a memory including: a user profile database including user metadata relating to a plurality of users, which user metadata relating to the plurality of users identifies attributes of the plurality of users; and a content library database including a plurality of data packets for providing to a user. The system includes a user device and at least one server. In some embodiments, the at least one server can: receive an evaluation generation request from the user device for generation of an evaluation; identify a cohort for recipient of the evaluation, wherein the cohort includes a plurality of users; retrieve user metadata from the memory; identify a hardware configuration of user devices associated with the plurality of users in the cohort; identify potential data packets based on information received in the evaluation generation request and on the identified hardware configuration of user devices associated with the plurality of users in the cohort; receive a selection of data packets for inclusion in the assessment from the identified potential data packets; calculate assessment data from metadata associated with the data packets selected for inclusion in the assessment; determine that the assessment does not meet at least one target parameter; and receive a selection of at least one remedial data packet for inclusion in the assessment.

In some embodiments, determining that the assessment does not meet at least one target parameter includes: receiving at least one desired target parameter; and comparing the assessment data to the at least one desired target parameter. In some embodiments, determining that the assessment does not meet at least one target parameter includes identifying an evaluation gap based on the comparing of the assessment data to the at least one desired target parameter. In some embodiments, the at least one server can identify at least one remedial data packet and provide the at least one remedial data packet to the user device.

In some embodiments, the at least one remedial data packet is identified based on the evaluation gap. In some embodiments, the at least one remedial data packet is identified based on the ability of the at least one remedial data packet to eliminate the evaluation gap via inclusion in the assessment. In some embodiments, the at least one server can: re-calculate assessment data after the selection of the at least one remedial data packet for inclusion in the assessment; compare the recalculated assessment data to at least one target parameter; and determine that the recalculated assessment data meets the at least one target parameter. In some embodiments, the at least one server can generate and send a compliance message indicating that the recalculated assessment data meets the at least one target parameter. In some embodiments, identifying a hardware configuration includes receiving hardware configuration data. In some embodiments, the hardware configuration data identifies at least one hardware based capability and at least one network capability of the user devices associated with the plurality of users in the cohort.

One aspect of the present disclosure relates to a method for automated assessment generation. The method includes: receiving at at least one server an evaluation generation request from a user device for generation of an evaluation; identifying at at least one server a cohort for recipient of the evaluation, wherein the cohort comprises a plurality of users; retrieving at the at least one server user metadata from a memory; identifying at the at least one server a hardware configuration of user devices associated with the plurality of users in the cohort; identifying at the at least one server at least one potential data packets based on information received in the evaluation generation request and on the identified hardware configuration of user devices associated with the plurality of users in the cohort; receiving a selection of data packets for inclusion in the assessment from the at least one identified potential data packets; calculating assessment data from metadata associated with the data packets selected for inclusion in the assessment; determining that the assessment does not meet at least one target parameter; and receiving a selection of at least one remedial data packet for inclusion in the assessment.

In some embodiments, determining that the assessment does not meet at least one target parameter includes: receiving at least one desired target parameter; and comparing the assessment data to the at least one desired target parameter. In some embodiments, determining that the assessment does not meet at least one target parameter includes identifying an evaluation gap based on the comparing of the assessment data to the at least one desired target parameter. In some embodiments, the method includes identifying at least one remedial data packet and providing the at least one remedial data packet to the user device. In some embodiments, the at least one remedial data packet is identified based on the evaluation gap.

In some embodiments, the at least one remedial data packet is identified based on the ability of the at least one remedial data packet to eliminate the evaluation gap via inclusion in the assessment. In some embodiments, the method includes: re-calculating assessment data after the selection of the at least one remedial data packet for inclusion in the assessment; comparing the recalculated assessment data to at least one target parameter; and determining that the recalculated assessment data meets the at least one target parameter. In some embodiments, the method includes generating and sending a compliance message indicating that the recalculated assessment data meets the at least one target parameter. In some embodiments, identifying a hardware configuration includes receiving hardware configuration data. In some embodiments, the hardware configuration data can identify at least one hardware based capability and at least one network capability of the user devices associated with the plurality of users in the cohort.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
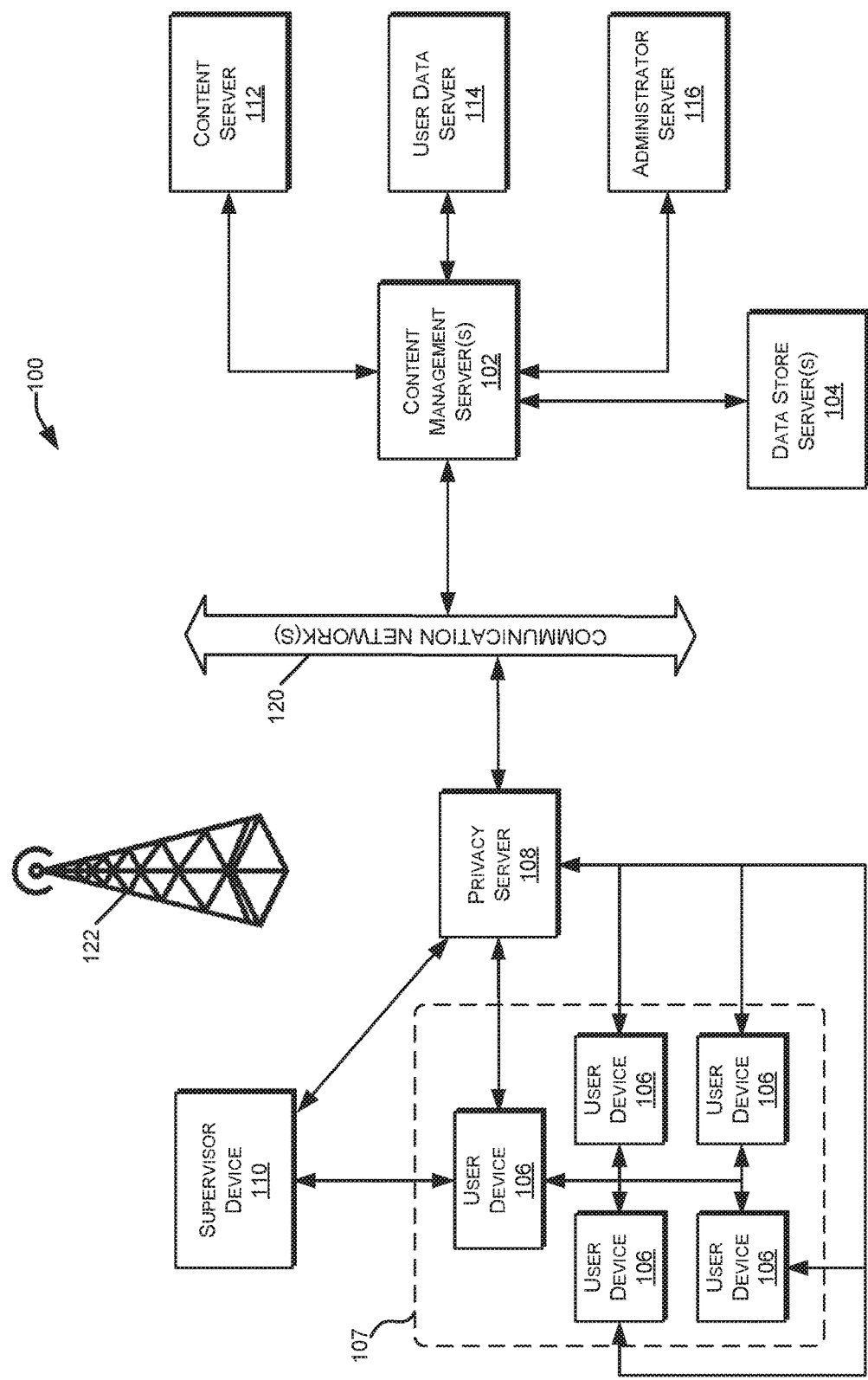
FIG. 1 is a block diagram illustrating an example of a content distribution network.

With reference now to FIG. 1, a block diagram is shown illustrating various components of a content distribution network (CDN) 100 which implements and supports certain embodiments and features described herein. In some embodiments, the content distribution network 100 can comprise one or several physical components and/or one or several virtual components such as, for example, one or several cloud computing components. In some embodiments, the content distribution network 100 can comprise a mixture of physical and cloud computing components.

Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing unit, memory systems, hard drives, network interfaces, power supplies, etc. Content management server 102 may include one or more server farms, clusters, or any other appropriate arrangement and/or combination of computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatingly connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provide access to consolidated, block level data storage. A SAN typically has its own network of storage devices that are generally not accessible through the local area network (LAN) by other devices. The SAN allows access to these devices in a manner such that these devices appear to be locally attached to the user device.

Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more devices including one or more user devices 106 and/or one or more supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as thin-client computers, Internet-enabled gaming systems, business or home appliances, and/or personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, plans, syllabi, reviews, evaluations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including his or her user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

The content distribution network 100 may include one or several navigation systems or features including, for example, the Global Positioning System ("GPS"), GALILEO, or the like, or location systems or features including, for example, one or several transceivers that can determine location of the one or several components of the content distribution network 100 via, for example, triangulation. All of these are depicted as navigation system 122.

In some embodiments, navigation system 122 can include one or several features that can communicate with one or several components of the content distribution network 100 including, for example, with one or several of the user devices 106 and/or with one or several of the supervisor devices 110. In some embodiments, this communication can include the transmission of a signal from the navigation system 122 which signal is received by one or several components of the content distribution network 100 and can be used to determine the location of the one or several components of the content distribution network 100.

Figure 2:
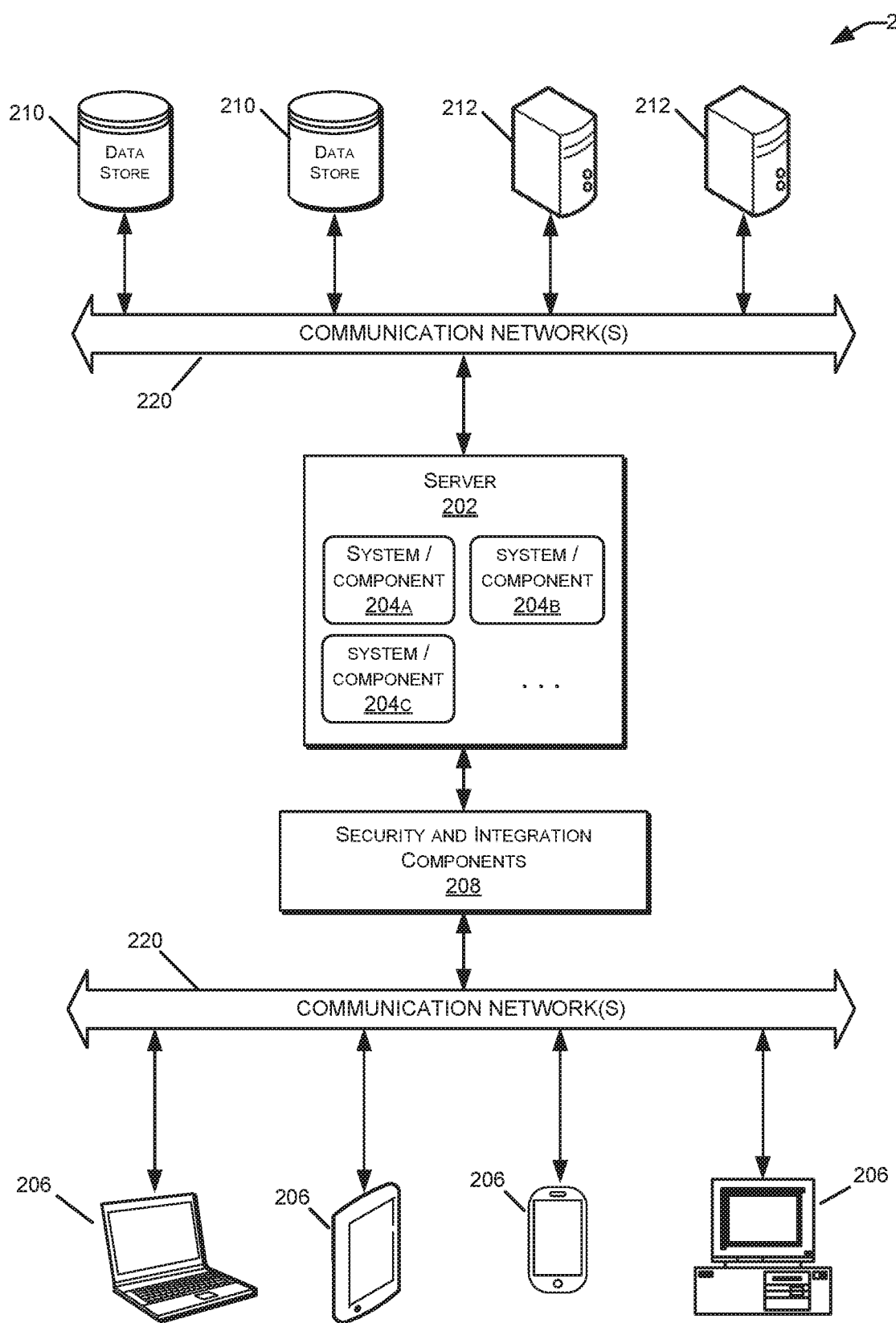
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser-based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN), or may use storage-as-a-service (STaaS) architectural model.

Figure 3:
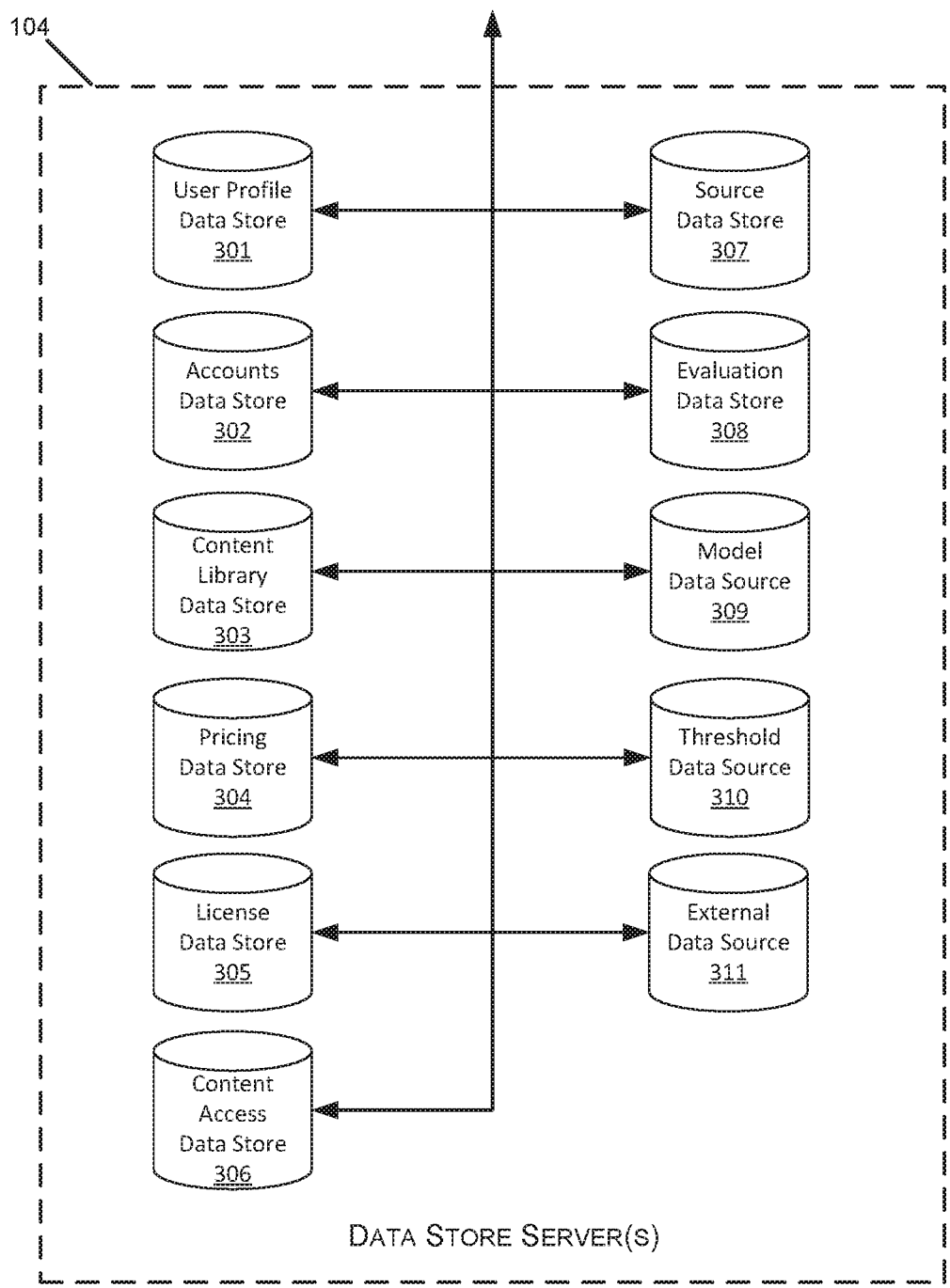
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-311 may reside in storage on a single computer server 104 (or a single server farm or cluster) under the control of a single entity, or may reside on separate servers operated by different entities and/or at remote locations. In some embodiments, data stores 301-311 may be accessed by the content management server 102 and/or other devices and servers within the network 100 (e.g., user devices 106, supervisor devices 110, administrator servers 116, etc.). Access to one or more of the data stores 301-311 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-311, including their functionality and types of data stored therein, are illustrative and non-limiting. Data stores server architecture, design, and the execution of specific data stores 301-311 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301, also referred to herein as a user profile database 301, may include information, also referred to herein as user metadata, relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.). In some embodiments, this information can relate to one or several individual end users such as, for example, one or several students, teachers, administrators, or the like, and in some embodiments, this information can relate to one or several institutional end users such as, for example, one or several schools, groups of schools such as one or several school districts, one or several colleges, one or several universities, one or several training providers, or the like. In some embodiments, this information can identify one or several user memberships in one or several groups such as, for example, a student's membership in a university, school, program, grade, course, class, or the like.

In some embodiments, the user profile database 301 can include information, such as a risk status, relating to a user's risk level. This risk information can characterize a degree of user risk; a user risk categorization such as, for example, high risk, intermediate risk, and/or low risk; sources of user risk, or the like. In some embodiments, this risk information can be associated with one or several interventions or remedial actions to address the user risk.

The user profile database 301 can include user metadata relating to a user's status, location, or the like. This information can identify, for example, a device a user is using, the location of that device, or the like. In some embodiments, this information can be generated based on any location detection technology including, for example, a navigation system 122, or the like. The user profile database 301 can include user metadata identifying communication information associated with users identified in the user profile database 301. This information can, for example, identify one or several devices used or controlled by the users, user telephone numbers, user email addresses, communication preferences, or the like.

Information relating to the user's status can identify, for example, logged-in status information that can indicate whether the user is presently logged-in to the content distribution network 100 and/or whether the log-in-is active. In some embodiments, the information relating to the user's status can identify whether the user is currently accessing content and/or participating in an activity from the content distribution network 100.

In some embodiments, information relating to the user's status can identify, for example, one or several attributes of the user's interaction with the content distribution network 100, and/or content distributed by the content distribution network 100. This can include data identifying the user's interactions with the content distribution network 100, the content consumed by the user through the content distribution network 100, or the like. In some embodiments, this can include data identifying the type of information accessed through the content distribution network 100 and/or the type of activity performed by the user via the content distribution network 100, the lapsed time since the last time the user accessed content and/or participated in an activity from the content distribution network 100, or the like. In some embodiments, this information can relate to a content program comprising an aggregate of data, content, and/or activities, and can identify, for example, progress through the content program, or through the aggregate of data, content, and/or activities forming the content program. In some embodiments, this information can track, for example, the amount of time since participation in and/or completion of one or several types of activities, the amount of time since communication with one or several supervisors and/or supervisor devices 110, or the like.

In some embodiments in which the one or several end users are individuals, and specifically are students, the user profile database 301 can further include user metadata relating to these students' academic and/or educational history. This information can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the content delivery network 100.

The user profile database 301 can include user metadata relating to one or several student learning preferences. In some embodiments, for example, the user, also referred to herein as the student or the student-user may have one or several preferred learning styles, one or several most effective learning styles, and/or the like. In some embodiments, the student's learning style can be any learning style describing how the student best learns or how the student prefers to learn. In one embodiment, these learning styles can include, for example, identification of the student as an auditory learner, as a visual learner, and/or as a tactile learner. In some embodiments, the data identifying one or several student learning styles can include data identifying a learning style based on the student's educational history such as, for example, identifying a student as an auditory learner when the student has received significantly higher grades and/or scores on assignments and/or in courses favorable to auditory learners. In some embodiments, this information can be stored in a tier of memory that is not the fastest memory in the content delivery network 100.

In some embodiments, the user profile data store 301 can further include user metadata identifying one or several user skill levels. In some embodiments, these one or several user skill levels can identify a skill level determined based on past performance by the user interacting with the content delivery network 100, and in some embodiments, these one or several user skill levels can identify a predicted skill level determined based on past performance by the user interacting with the content delivery network 100 and one or several predictive models.

The user profile database 301 can further include user metadata relating to one or several teachers and/or instructors who are responsible for organizing, presenting, and/or managing the presentation of information to the student. In some embodiments, user profile database 301 can include information identifying courses and/or subjects that have been taught by the teacher, data identifying courses and/or subjects currently taught by the teacher, and/or data identifying courses and/or subjects that will be taught by the teacher. In some embodiments, this can include information relating to one or several teaching styles of one or several teachers. In some embodiments, the user profile database 301 can further include information indicating past evaluations and/or evaluation reports received by the teacher. In some embodiments, the user profile database 301 can further include information relating to improvement suggestions received by the teacher, training received by the teacher, continuing education received by the teacher, and/or the like. In some embodiments, this information can be stored in a tier of memory that is not the fastest memory in the content delivery network 100.

An accounts data store 302, also referred to herein as an accounts database 302, may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303, also referred to herein as a content library database 303, may include information describing the individual content items (or content resources or data packets) available via the content distribution network 100. In some embodiments, these data packets in the content library database 303 can be linked to form an object network. In some embodiments, these data packets can be linked in the object network according to one or several sequential relationship which can be, in some embodiments, prerequisite relationships that can, for example, identify the relative hierarchy and/or difficulty of the data objects. In some embodiments, this hierarchy of data objects can be generated by the content distribution network 100 according to user experience with the object network, and in some embodiments, this hierarchy of data objects can be generated based on one or several existing and/or external hierarchies such as, for example, a syllabus, a table of contents, or the like. In some embodiments, for example, the object network can correspond to a syllabus such that content for the syllabus is embodied in the object network.

In some embodiments, the content library data store 303 can comprise a syllabus, a schedule, or the like. In some embodiments, the syllabus or schedule can identify one or several tasks and/or events relevant to the user. In some embodiments, for example, when the user is a member of a group such as a section or a class, these tasks and/or events relevant to the user can identify one or several assignments, quizzes, exams, or the like.

In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources. For example, content relationships may be implemented as graph structures, which may be stored in the library data store 303 or in an additional store for use by selection algorithms along with the other metadata.

In some embodiments, the content library data store 303 can contain information used in evaluating responses received from users. In some embodiments, for example, a user can receive content from the content distribution network 100 and can, subsequent to receiving that content, provide a response to the received content. In some embodiments, for example, the received content can comprise one or several questions, prompts, or the like, and the response to the received content can comprise an answer to those one or several questions, prompts, or the like. In some embodiments, information, referred to herein as "comparative data," from the content library data store 303 can be used to determine whether the responses are the correct and/or desired responses.

In some embodiments, the content library database 303 and/or the user profile database 301 can comprise an aggregation network, also referred to herein as a content network or content aggregation network. The aggregation network can comprise a plurality of content aggregations that can be linked together by, for example: creation by common user; relation to a common subject, topic, skill, or the like; creation from a common set of source material such as source data packets; or the like. In some embodiments, the content aggregation can comprise a grouping of content comprising the presentation portion that can be provided to the user in the form of, for example, a flash card and an extraction portion that can comprise the desired response to the presentation portion such as for example, an answer to a flash card. In some embodiments, one or several content aggregations can be generated by the content distribution network 100 and can be related to one or several data packets that can be, for example, organized in object network. In some embodiments, the one or several content aggregations can be each created from content stored in one or several of the data packets.

In some embodiments, the content aggregations located in the content library database 303 and/or the user profile database 301 can be associated with a user-creator of those content aggregations. In some embodiments, access to content aggregations can vary based on, for example, whether a user created the content aggregations. In some embodiments, the content library database 303 and/or the user profile database 301 can comprise a database of content aggregations associated with a specific user, and in some embodiments, the content library database 303 and/or the user profile database 301 can comprise a plurality of databases of content aggregations that are each associated with a specific user. In some embodiments, these databases of content aggregations can include content aggregations created by their specific user and, in some embodiments, these databases of content aggregations can further include content aggregations selected for inclusion by their specific user and/or a supervisor of that specific user. In some embodiments, these content aggregations can be arranged and/or linked in a hierarchical relationship similar to the data packets in the object network and/or linked to the object network in the object network or the tasks or skills associated with the data packets in the object network or the syllabus or schedule.

In some embodiments, the content aggregation network, and the content aggregations forming the content aggregation network can be organized according to the object network and/or the hierarchical relationships embodied in the object network. In some embodiments, the content aggregation network, and/or the content aggregations forming the content aggregation network can be organized according to one or several tasks identified in the syllabus, schedule or the like.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

A model data store 309, also referred to herein as a model database 309, can store information relating to one or several machine-learning algorithms, classifiers, predictive models which predictive models can be, for example, statistical models and/or the like. In some embodiments, the machine-learning algorithms or processes can include one or several classifiers such as a linear classifier. The machine-learning algorithm can include at least one of: a Random Forrest algorithm; an Artificial Neural Network; an AdaBoost algorithm; a Naïve Bayes algorithm; Boosting Tree, and a Support Vector Machine.

In some embodiments these machine-learning algorithms and/or models can include one or several evidence models, risk models, skill models, or the like. In some embodiments, an evidence model can be a mathematically-based statistical model. The evidence model can be based on, for example, Item Response Theory (IRT), Bayesian Network (Bayes net), Performance Factor Analysis (PFA), or the like. The evidence model can, in some embodiments, be customizable to a user and/or to one or several content items. Specifically, one or several inputs relating to the user and/or to one or several content items can be inserted into the evidence model. These inputs can include, for example, one or several measures of user skill level, one or several measures of content item difficulty and/or skill level, or the like. The customized evidence model can then be used to predict the likelihood of the user providing desired or undesired responses to one or several of the content items.

In some embodiments, the risk models can include one or several models that can be used to calculate one or several model function values. In some embodiments, these one or several model function values can be used to calculate a risk probability, which risk probability can characterize the risk of a user such as a student-user failing to achieve a desired outcome such as, for example, failing to correctly respond to one or several data packets, failure to achieve a desired level of completion of a program, for example in a pre-defined time period, failure to achieve a desired learning outcome, or the like. In some embodiments, the risk probability can identify the risk of the student-user failing to complete 60% of the program.

In some embodiments, these models can include a plurality of model functions including, for example, a first model function, a second model function, a third model function, and a fourth model function. In some embodiments, some or all of the model functions can be associated with a portion of the program such as, for example, a completion stage and/or completion status of the program. In one embodiment, for example, the first model function can be associated with a first completion status, the second model function can be associated with a second completion status, the third model function can be associated with a third completion status, and the fourth model function can be associated with a fourth completion status. In some embodiments, these completion statuses can be selected such that some or all of these completion statuses are less than the desired level of completion of the program. Specifically, in some embodiments, these completion statuses can be selected to all be at less than 60% completion of the program, and more specifically, in some embodiments, the first completion status can be at 20% completion of the program, the second completion status can be at 30% completion of the program, the third completion status can be at 40% completion of the program, and the fourth completion status can be at 50% completion of the program. Similarly, any desired number of model functions can be associated with any desired number of completion statuses.

In some embodiments, a model function can be selected from the plurality of model functions based on a student-user's progress through a program. In some embodiments, the student-user's progress can be compared to one or several status trigger thresholds, each of which status trigger thresholds can be associated with one or more of the model functions. If one of the status triggers is triggered by the student-user's progress, the corresponding one or several model functions can be selected.

The model functions can comprise a variety of types of models and/or functions. In some embodiments, each of the model functions outputs a function value that can be used in calculating a risk probability. This function value can be calculated by performing one or several mathematical operations on one or several values indicative of one or several user attributes and/or user parameters, also referred to herein as program status parameters. In some embodiments, each of the model functions can use the same program status parameters, and in some embodiments, the model functions can use different program status parameters. In some embodiments, the model functions use different program status parameters when at least one of the model functions uses at least one program status parameter that is not used by others of the model functions.

In some embodiments, a skill model can comprise a statistical model identifying a predictive skill level of one or several students. In some embodiments, this model can identify a single skill level of a student and/or a range of possible skill levels of a student. In some embodiments, this statistical model can identify a skill level of a student-user and an error value or error range associated with that skill level. In some embodiments, the error value can be associated with a confidence interval determined based on a confidence level. Thus, in some embodiments, as the number of student interactions with the content distribution network increases, the confidence level can increase and the error value can decrease such that the range identified by the error value about the predicted skill level is smaller.

In some embodiments, the model database 310 can include a plurality of learning algorithms, classifiers, and/or models and can include information identifying features used by the plurality of learning algorithms, classifiers, and/or models in generating one or several predictions such as, for example, a risk prediction. In some embodiments, for example, some or all of the plurality of learning algorithms, classifiers, and/or models can use different features in generating one or several predictions. These features can be identified in the model database 310 in association with the plurality of learning algorithms, classifiers, and/or models. In some embodiments, the model database 310 can further include information identifying a format and/or form for the features to be in to allow inputting into the associated one or several of the plurality of learning algorithms, classifiers, and/or models A threshold database 310, also referred to herein as a threshold database, can store one or several threshold values. These one or several threshold values can delineate between states or conditions. In one exemplary embodiment, for example, a threshold value can delineate between an acceptable user performance and an unacceptable user performance, between content appropriate for a user and content that is inappropriate for a user, between risk levels, or the like.

In addition to the illustrative data stores described above, data store server(s) 104 (e.g., database servers, file-based storage servers, etc.) may include one or more external data aggregators 311. External data aggregators 311 may include third-party data sources accessible to the content management network 100, but not maintained by the content management network 100. External data aggregators 311 may include any electronic information source relating to the users, content resources, or applications of the content distribution network 100. For example, external data aggregators 311 may be third-party data stores containing demographic data, education-related data, consumer sales data, health-related data, and the like. Illustrative external data aggregators 311 may include, for example, social networking web servers, public records data stores, learning management systems, educational institution servers, business servers, consumer sales data stores, medical record data stores, etc. Data retrieved from various external data aggregators 311 may be used to verify and update user account information, suggest user content, and perform user and content evaluations.

Figure 4:
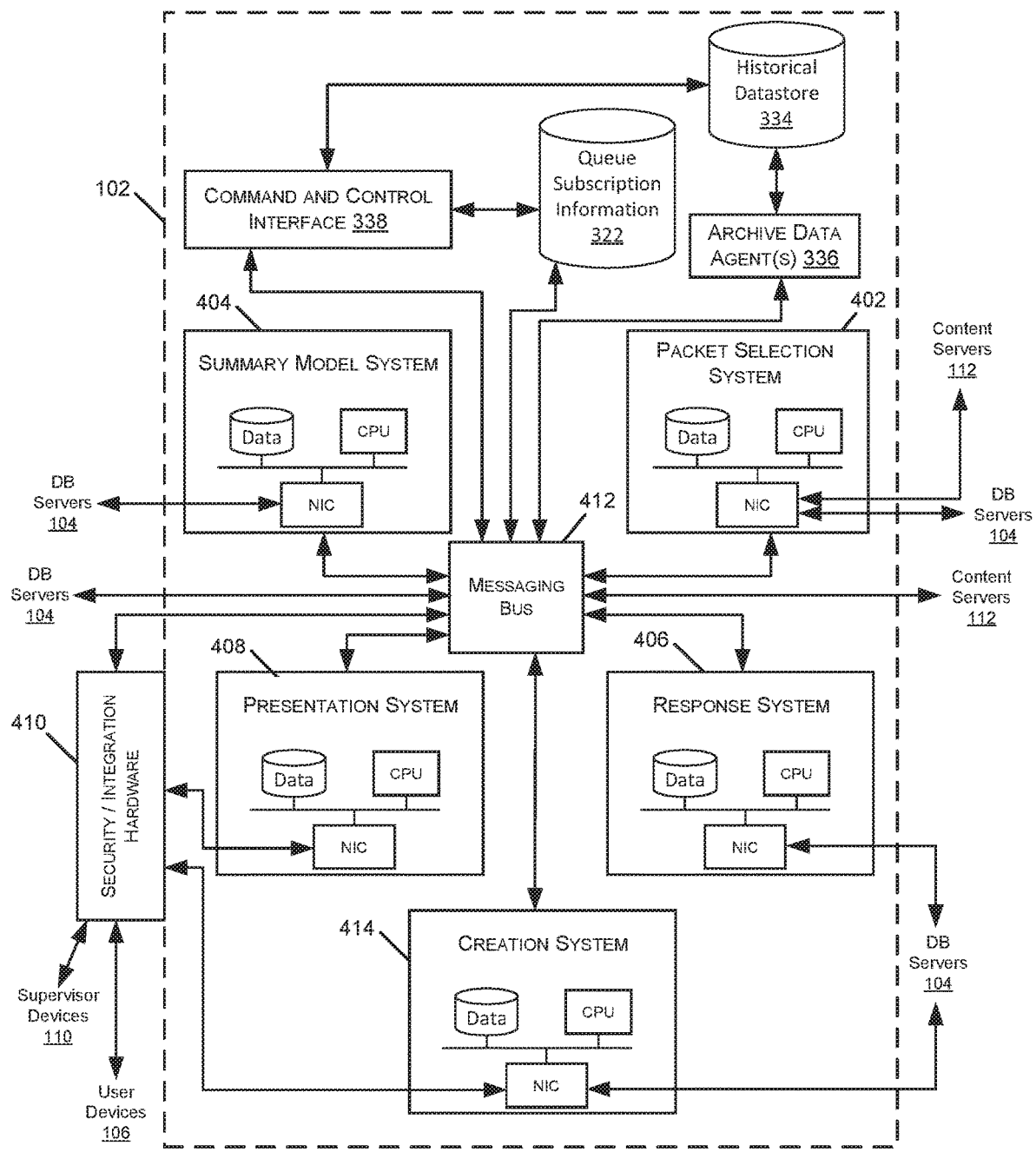
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. In such an embodiment, content management server 102 performs internal data gathering and processing of streamed content along with external data gathering and processing. Other embodiments could have either all external or all internal data gathering. This embodiment allows reporting timely information that might be of interest to the reporting party or other parties. In this embodiment, the content management server 102 can monitor gathered information from several sources to allow it to make timely business and/or processing decisions based upon that information. For example, reports of user actions and/or responses, as well as the status and/or results of one or several processing tasks could be gathered and reported to the content management server 102 from a number of sources.

Internally, the content management server 102 gathers information from one or more internal components 402-408. The internal components 402-408 gather and/or process information relating to such things as: content provided to users; content consumed by users; responses provided by users; user skill levels; content difficulty levels; next content for providing to users; etc. The internal components 402-408 can report the gathered and/or generated information in real-time, near real-time or along another time line. To account for any delay in reporting information, a time stamp or staleness indicator can inform others of how timely the information was sampled. The content management server 102 can opt to allow third parties to use internally or externally gathered information that is aggregated within the server 102 by subscription to the content distribution network 100.

A command and control (CC) interface 338 configures the gathered input information to an output of data streams, also referred to herein as content streams. APIs for accepting gathered information and providing data streams are provided to third parties external to the server 102 who want to subscribe to data streams. The server 102 or a third party can design as yet undefined APIs using the CC interface 338. The server 102 can also define authorization and authentication parameters using the CC interface 338 such as authentication, authorization, login, and/or data encryption. CC information is passed to the internal components 402-408 and/or other components of the content distribution network 100 through a channel separate from the gathered information or data stream in this embodiment, but other embodiments could embed CC information in these communication channels. The CC information allows throttling information reporting frequency, specifying formats for information and data streams, deactivation of one or several internal components 402-408 and/or other components of the content distribution network 100, updating authentication and authorization, etc.

The various data streams that are available can be researched and explored through the CC interface 338. Those data stream selections for a particular subscriber, which can be one or several of the internal components 402-408 and/or other components of the content distribution network 100, are stored in the queue subscription information database 322. The server 102 and/or the CC interface 338 then routes selected data streams to processing subscribers that have selected delivery of a given data stream. Additionally, the server 102 also supports historical queries of the various data streams that are stored in an historical data store 334 as gathered by an archive data agent 336. Through the CC interface 238 various data streams can be selected for archiving into the historical data store 334.

Components of the content distribution network 100 outside of the server 102 can also gather information that is reported to the server 102 in real-time, near real-time or along another time line. There is a defined API between those components and the server 102. Each type of information or variable collected by server 102 falls within a defined API or multiple APIs. In some cases, the CC interface 338 is used to define additional variables to modify an API that might be of use to processing subscribers. The additional variables can be passed to all processing subscribes or just a subset. For example, a component of the content distribution network 100 outside of the server 102 may report a user response but define an identifier of that user as a private variable that would not be passed to processing subscribers lacking access to that user and/or authorization to receive that user data. Processing subscribers having access to that user and/or authorization to receive that user data would receive the subscriber identifier along with response reported that component. Encryption and/or unique addressing of data streams or sub-streams can be used to hide the private variables within the messaging queues.

The user devices 106 and/or supervisor devices 110 communicate with the server 102 through security and/or integration hardware 410. The communication with security and/or integration hardware 410 can be encrypted or not. For example, a socket using a TCP connection could be used. In addition to TCP, other transport layer protocols like SCTP and UDP could be used in some embodiments to intake the gathered information. A protocol such as SSL could be used to protect the information over the TCP connection. Authentication and authorization can be performed to any user devices 106 and/or supervisor device interfacing to the server 102. The security and/or integration hardware 410 receives the information from one or several of the user devices 106 and/or the supervisor devices 110 by providing the API and any encryption, authorization, and/or authentication. In some cases, the security and/or integration hardware 410 reformats or rearranges this received information.

The messaging bus 412, also referred to herein as a messaging queue or a messaging channel, can receive information from the internal components of the server 102 and/or components of the content distribution network 100 outside of the server 102 and distribute the gathered information as a data stream to any processing subscribers that have requested the data stream from the messaging queue 412. As indicate in FIG. 4, processing subscribers are indicated by a connector to the messaging bus 412, the connector having an arrow head pointing away from the messaging bus 412. Only data streams within the messaging queue 412 that a particular processing subscriber has subscribed to may be read by that processing subscriber if received at all. Gathered information sent to the messaging queue 412 is processed and returned in a data stream in a fraction of a second by the messaging queue 412. Various multicasting and routing techniques can be used to distribute a data stream from the messaging queue 412 that a number of processing subscribers have requested. Protocols such as Multicast or multiple Unicast could be used to distribute streams within the messaging queue 412. Additionally, transport layer protocols like TCP, SCTP and UDP could be used in various embodiments.

Through the CC interface 338, an external or internal processing subscriber can be assigned one or more data streams within the messaging queue 412. A data stream is a particular type of message in a particular category. For example, a data stream can comprise all of the data reported to the messaging bus 412 by a designated set of components. One or more processing subscribers could subscribe and receive the data stream to process the information and make a decision and/or feed the output from the processing as gathered information fed back into the messaging queue 412. Through the CC interface 338 a developer can search the available data streams or specify a new data stream and its API. The new data stream might be determined by processing a number of existing data streams with a processing subscriber.

The CDN 110 has internal processing subscribers 402-408 that process assigned data streams to perform functions within the server 102. Internal processing subscribers 402-408 could perform functions such as providing content to a user, receiving a response from a user, determining the correctness of the received response, updating one or several models based on the correctness of the response, recommending new content for providing to one or several users, or the like. The internal processing subscribers 402-408 can decide filtering and weighting of records from the data stream. To the extent that decisions are made based upon analysis of the data stream, each data record is time stamped to reflect when the information was gathered such that additional credibility could be given to more recent results, for example. Other embodiments may filter out records in the data stream that are from an unreliable source or stale. For example, a particular contributor of information may prove to have less than optimal gathered information and that could be weighted very low or removed altogether.

Internal processing subscribers 402-408 may additionally process one or more data streams to provide different information to feed back into the messaging queue 412 to be part of a different data stream. For example, hundreds of user devices 106 could provide responses that are put into a data stream on the messaging queue 412. An internal processing subscriber 402-408 could receive the data stream and process it to determine the difficulty of one or several data packets provided to one or several users, and supply this information back onto the messaging queue 412 for possible use by other internal and external processing subscribers.

As mentioned above, the CC interface 338 allows the CDN 110 to query historical messaging queue 412 information. An archive data agent 336 listens to the messaging queue 412 to store data streams in a historical database 334. The historical database 334 may store data streams for varying amounts of time and may not store all data streams. Different data streams may be stored for different amounts of time.

With regard to the components 402-48, the content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a packet selection system 402. The packet selection system 402 may be implemented using dedicated hardware within the content distribution network 100 (e.g., a packet selection server 402), or using designated hardware and software resources within a shared content management server 102. In some embodiments, the packet selection system 402 may adjust the selection and adaptive capabilities of content resources to match the needs and desires of the users receiving the content. For example, the packet selection system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the packet selection system 402 may modify content resources for individual users.

In some embodiments, the packet selection system 402 can include a recommendation engine, also referred to herein as an adaptive recommendation engine. In some embodiments, the recommendation engine can select one or several pieces of content, also referred to herein as data packets, for providing to a user. These data packets can be selected based on, for example, the information retrieved from the database server 104 including, for example, the user profile database 301, the content library database 303, the model database 309, or the like. In some embodiments, these one or several data packets can be adaptively selected and/or selected according to one or several selection rules. In one embodiment, for example, the recommendation engine can retrieve information from the user profile database 301 identifying, for example, a skill level of the user. The recommendation engine can further retrieve information from the content library database 303 identifying, for example, potential data packets for providing to the user and the difficulty of those data packets and/or the skill level associated with those data packets.

The recommendation engine can identify one or several potential data packets for providing and/or one or several data packets for providing to the user based on, for example, one or several rules, models, predictions, or the like. The recommendation engine can use the skill level of the user to generate a prediction of the likelihood of one or several users providing a desired response to some or all of the potential data packets. In some embodiments, the recommendation engine can pair one or several data packets with selection criteria that may be used to determine which packet should be delivered to a student-user based on one or several received responses from that student-user. In some embodiments, one or several data packets can be eliminated from the pool of potential data packets if the prediction indicates either too high a likelihood of a desired response or too low a likelihood of a desired response. In some embodiments, the recommendation engine can then apply one or several selection criteria to the remaining potential data packets to select a data packet for providing to the user. These one or several selection criteria can be based on, for example, criteria relating to a desired estimated time for receipt of response to the data packet, one or several content parameters, one or several assignment parameters, or the like.

A content management server 102 also may include a summary model system 404. The summary model system 404 may be implemented using dedicated hardware within the content distribution network 100 (e.g., a summary model server 404), or using designated hardware and software resources within a shared content management server 102. In some embodiments, the summary model system 404 may monitor the progress of users through various types of content resources and groups, such as media compilations, courses or curriculums in training or educational contexts, interactive gaming environments, and the like. For example, the summary model system 404 may query one or more databases and/or data store servers 104 to retrieve user data such as associated content compilations or programs, content completion status, user goals, results, and the like.

A content management server 102 also may include a response system 406, which can include, in some embodiments, a response processor. The response system 406 may be implemented using dedicated hardware within the content distribution network 100 (e.g., a response server 406), or using designated hardware and software resources within a shared content management server 102. The response system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the response server 406 may analyze the information to determine the effectiveness or appropriateness of content resources with, for example, a subject matter, an age group, a skill level, or the like. In some embodiments, the response system 406 may provide updates to the packet selection system 402 or the summary model system 404, with the attributes of one or more content resources or groups of resources within the network 100. The response system 406 also may receive and analyze user evaluation data from user devices 106, supervisor devices 110, and administrator servers 116, etc. For instance, response system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

In some embodiments, the response system 406 can be further configured to receive one or several responses from the user and analyze these one or several responses. In some embodiments, for example, the response system 406 can be configured to translate the one or several responses into one or several observables. As used herein, an observable is a characterization of a received response. In some embodiments, the translation of the one or several responses into one or several observables can include determining whether the one or several responses are correct responses, also referred to herein as desired responses, or are incorrect responses, also referred to herein as undesired responses. In some embodiments, the translation of the one or several responses into one or several observables can include characterizing the degree to which one or several responses are desired responses and/or undesired responses. In some embodiments, one or several values can be generated by the response system 406 to reflect user performance in responding to the one or several data packets. In some embodiments, these one or several values can comprise one or several scores for one or several responses and/or data packets.

A content management server 102 also may include a presentation system 408. The presentation system 408 may be implemented using dedicated hardware within the content distribution network 100 (e.g., a presentation server 408), or using designated hardware and software resources within a shared content management server 102. The presentation system 408 can include a presentation engine that can be, for example, a software module running on the content delivery system.

The presentation system 408, also referred to herein as the presentation module or the presentation engine, may control generation of one or several user interfaces and/or the content presented to a user via these one or several user interfaces. In some embodiments, for example, the presentation system 408 of the server 102 can generate and/or provide content to one or several of the user devices 106 and/or supervisor devices 110 for display via a user interface.

The presentation system 408 may receive content resources from the packet selection system 402 and/or from the summary model system 404, and provide the resources to user devices 106. The presentation system 408 may determine the appropriate presentation format for the content resources based on the user characteristics and preferences, and/or the device capabilities of user devices 106. If needed, the presentation system 408 may convert the content resources to the appropriate presentation format and/or compress the content before transmission. In some embodiments, the presentation system 408 may also determine the appropriate transmission media and communication protocols for transmission of the content resources.

In some embodiments, the presentation system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
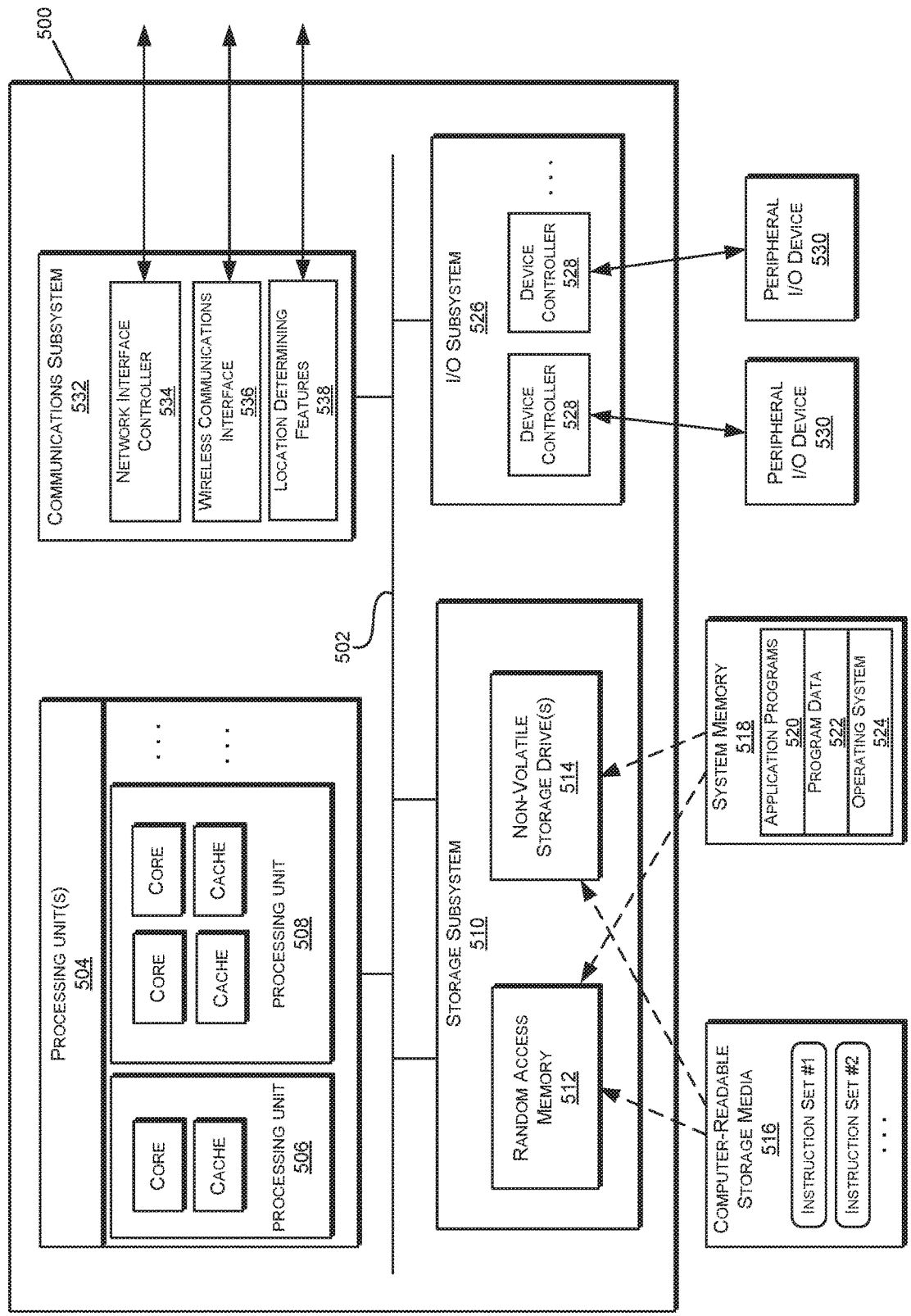
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein, and specifically can include, for example, one or several of the user devices 106, the supervisor device 110, and/or any of the servers 102, 104, 108, 112, 114, 116. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater).

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500. The I/O subsystem 526 may provide one or several outputs to a user by converting one or several electrical signals to the user in perceptible and/or interpretable form, and may receive one or several inputs from the user by generating one or several electrical signals based on one or several user-caused interactions with the I/O subsystem such as the depressing of a key or button, the moving of a mouse, the interaction with a touchscreen or trackpad, the interaction of a sound wave with a microphone, or the like.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.). The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that, when executed by a processor, provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. As illustrated in FIG. 5, the communications subsystem 532 may include, for example, one or more location determining features 538 such as one or several navigation system features and/or receivers, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 311). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
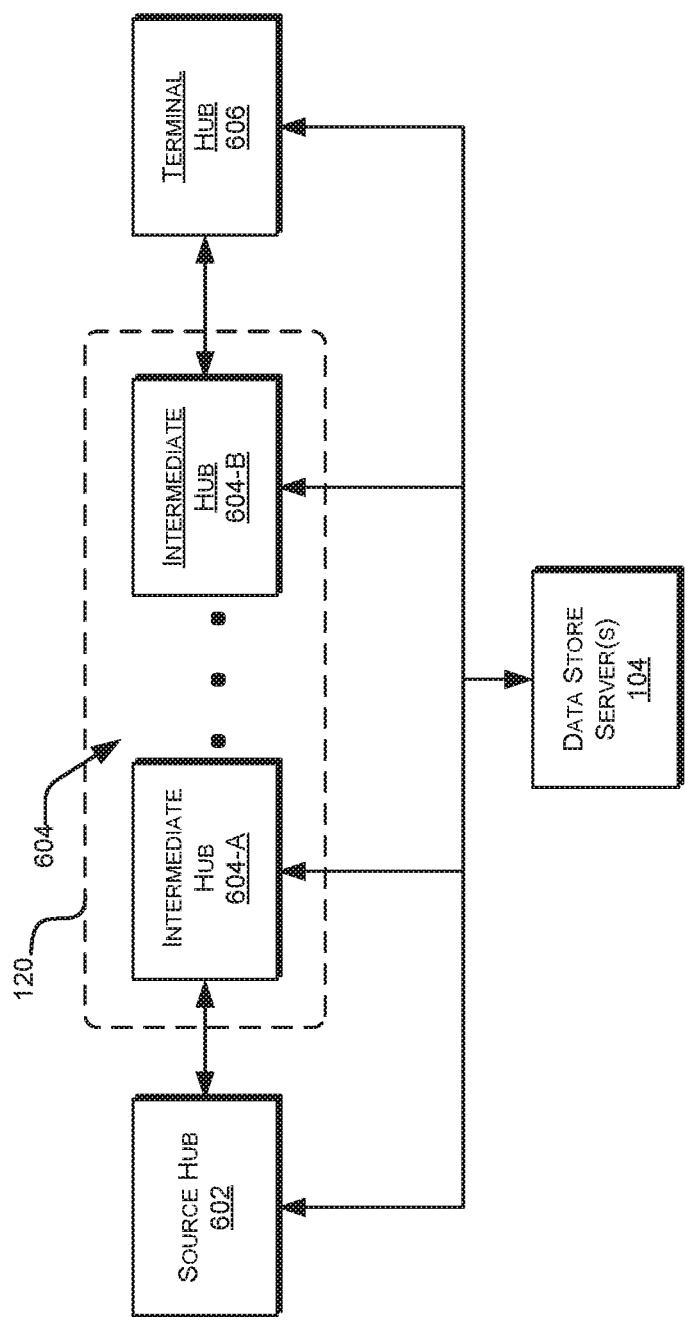
FIG. 6 is a block diagram illustrating one embodiment of the communication network.

With reference now to FIG. 6, a block diagram illustrating one embodiment of the communication network is shown. Specifically, FIG. 6 depicts one hardware configuration in which messages are exchanged between a source hub 602 via the communication network 120 that can include one or several intermediate hubs 604. In some embodiments, the source hub 602 can be any one or several components of the content distribution network generating and initiating the sending of a message, and the terminal hub 606 can be any one or several components of the content distribution network 100 receiving and not re-sending the message. In some embodiments, for example, the source hub 602 can be one or several of the user device 106, the supervisor device 110, and/or the server 102, and the terminal hub 606 can likewise be one or several of the user device 106, the supervisor device 110, and/or the server 102. In some embodiments, the intermediate hubs 604 can include any computing device that receives the message and resends the message to a next node.

As seen in FIG. 6, in some embodiments, each of the hubs 602, 604, 606 can be communicatingly connected with the data store 104. In such an embodiments, some or all of the hubs 602, 604, 606 can send information to the data store 104 identifying a received message and/or any sent or resent message. This information can, in some embodiments, be used to determine the completeness of any sent and/or received messages and/or to verify the accuracy and completeness of any message received by the terminal hub 606.

In some embodiments, the communication network 120 can be formed by the intermediate hubs 604. In some embodiments, the communication network 120 can comprise a single intermediate hub 604, and in some embodiments, the communication network 120 can comprise a plurality of intermediate hubs. In one embodiment, for example, and as depicted in FIG. 6, the communication network 120 includes a first intermediate hub 604-A and a second intermediate hub 604-B.

Figure 7:
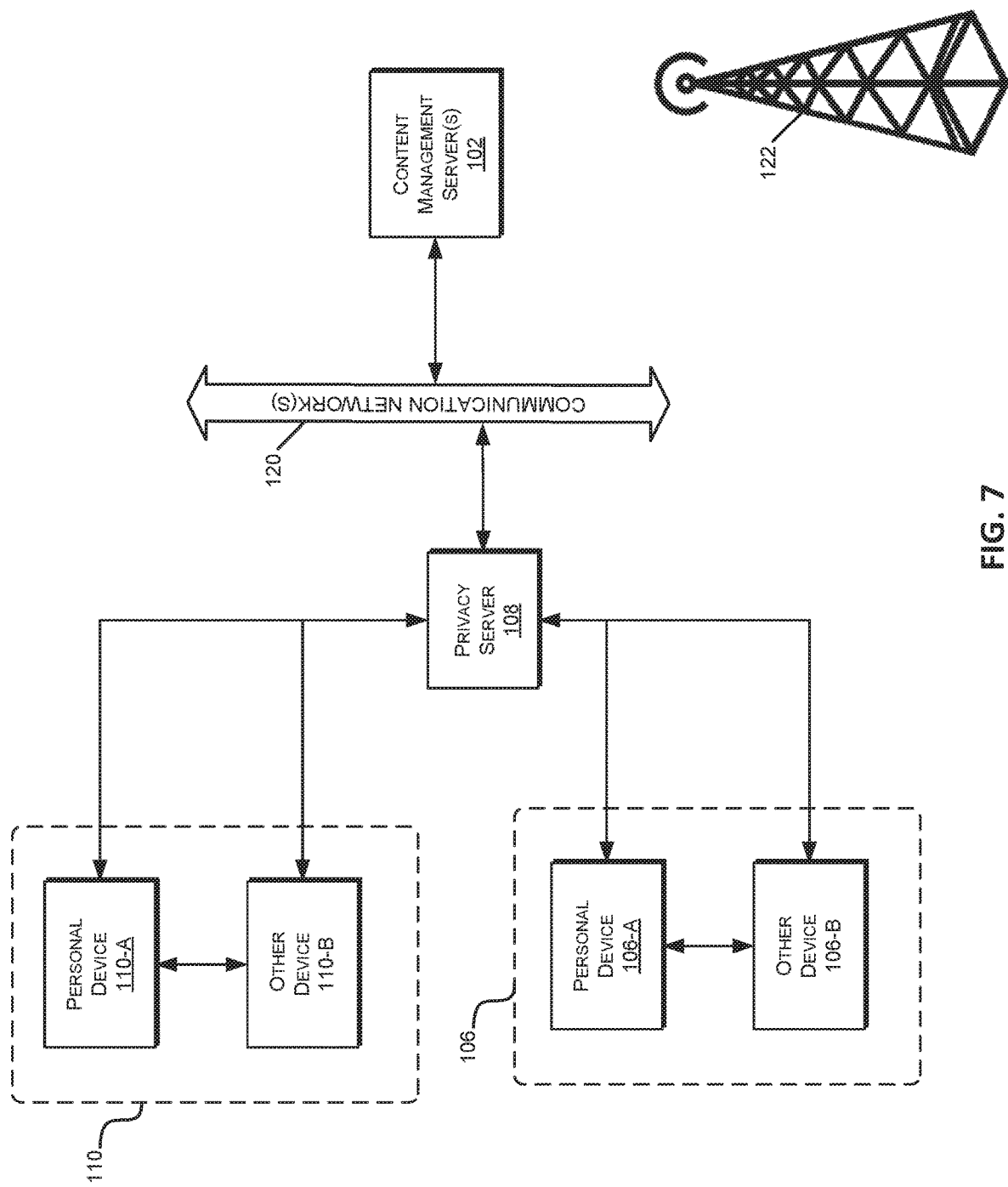
FIG. 7 is a block diagram illustrating one embodiment of user device and supervisor device communication.

With reference now to FIG. 7, a block diagram illustrating one embodiment of user device 106 and supervisor device 110 communication is shown. In some embodiments, for example, a user may have multiple devices that can connect with the content distribution network 100 to send or receive information. In some embodiments, for example, a user may have a personal device such as a mobile device, a Smartphone, a tablet, a Smartwatch, a laptop, a PC, or the like. In some embodiments, the other device can be any computing device in addition to the personal device. This other device can include, for example, a laptop, a PC, a Smartphone, a tablet, a Smartwatch, or the like. In some embodiments, the other device differs from the personal device in that the personal device is registered as such within the content distribution network 100 and the other device is not registered as a personal device within the content distribution network 100.

Specifically with respect to FIG. 7, the user device 106 can include a personal user device 106-A and one or several other user devices 106-B. In some embodiments, one or both of the personal user device 106-A and the one or several other user devices 106-B can be communicatingly connected to the content management server 102 and/or to the navigation system 122. Similarly, the supervisor device 110 can include a personal supervisor device 110-A and one or several other supervisor devices 110-B. In some embodiments, one or both of the personal supervisor device 110-A and the one or several other supervisor devices 110-B can be communicatingly connected to the content management server 102 and/or to the navigation system 122.

In some embodiments, the content distribution network can send one or more alerts to one or more user devices 106 and/or one or more supervisor devices 110 via, for example, the communication network 120. In some embodiments, the receipt of the alert can result in the launching of an application within the receiving device, and in some embodiments, the alert can include a link that, when selected, launches the application or navigates a web-browser of the device of the selector of the link to a page or portal associated with the alert.

In some embodiments, for example, the providing of this alert can include the identification of one or several user devices 106 and/or student-user accounts associated with the student-user and/or one or several supervisor devices 110 and/or supervisor-user accounts associated with the supervisor-user. After these one or several devices 106, 110 and/or accounts have been identified, the providing of this alert can include determining an active device of the devices 106, 110 based on determining which of the devices 106, 110 and/or accounts are actively being used, and then providing the alert to that active device.

Specifically, if the user is actively using one of the devices 106, 110 such as the other user device 106-B and the other supervisor device 110-B, and/or accounts, the alert can be provided to the user via that other device 106-B, 110-B and/or account that is actively being used. If the user is not actively using an other device 106-B, 110-B and/or account, a personal device 106-A, 110-A device, such as a smart phone or tablet, can be identified and the alert can be provided to this personal device 106-A, 110-A. In some embodiments, the alert can include code to direct the default device to provide an indicator of the received alert such as, for example, an aural, tactile, or visual indicator of receipt of the alert.

In some embodiments, the recipient device 106, 110 of the alert can provide an indication of receipt of the alert. In some embodiments, the presentation of the alert can include the control of the I/O subsystem 526 to, for example, provide an aural, tactile, and/or visual indicator of the alert and/or of the receipt of the alert. In some embodiments, this can include controlling a screen of the supervisor device 110 to display the alert, data contained in alert and/or an indicator of the alert.

Figure 8:
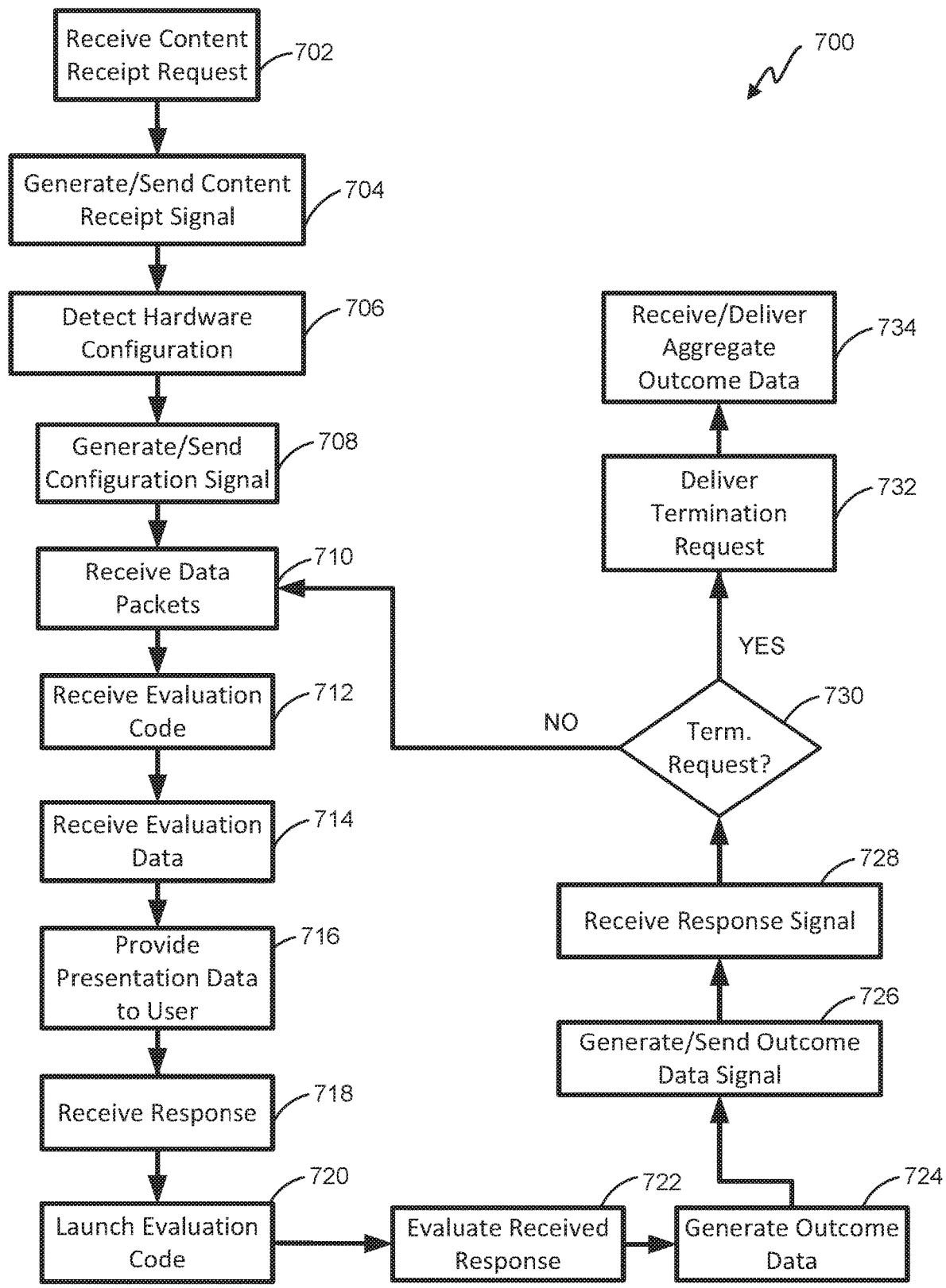
FIG. 8 is a flowchart illustrating one embodiment of a process for delivering an adaptive assessment.

With reference now to FIG. 8, a flowchart illustrating one embodiment of a process 700 for delivering an adaptive assessment is shown. The process 700 can be performed by all or portions of the content distribution network 100, including, for example, one or several of the user devices 106. The process 700 begins at block 702, wherein a content receipt request is received by the user device 106, and specifically by the I/O subsystem 526 of the user device. In some embodiments, the content receipt request can be a request from the user inputted into the user device 106, which request indicates an intent to receive a new piece of content.

After the content receipt request has been received, the process 700 proceeds block 704 wherein a content receipt signal is generated and/or sent. In some embodiments, the content receipt signal can comprise one or several electrical signals and/or a communication that can be generated and/or sent by the user device 106 and/or by the communications subsystem 532 of the user device 106. In some embodiments, the content receipt signal can include information requesting selection and providing of content by the server 102 to the user device 106. In some embodiments, the content receipt signal, also referred to herein as a content request, can comprise a user identifier which identifies the user for whom the content is being requested and/or from whom the content receipt request was received and a device identifier identifying the user device 106 from which the content receipt signal is sent After the content receipt signal is generated and/or sent, the process 700 proceeds to block 706 wherein a hardware configuration of the user devices detected. In some embodiments, this can include detection of one or several hardware and/or software features of the user device 106 and the capabilities of the same. In some embodiments, for example, this can include identification of one or several speakers, microphones, cameras, keyboards, touch screens, mouses, trackpads, scanners, screens, screen capabilities, speaker capabilities, or the like. In some embodiments, the hardware configuration can further identify one or several attributes of the connectivity of the user device 106 such as, for example, the network capability and/or bandwidth of the between the user device 106 and the communication network 120. In some embodiments, for example, content can be selected by the server 102 that matches the capabilities of the user device 106. Thus, in some embodiments, content may be selected or excluded from selection based on the connectivity of the device and/or whether the user device has one or several speakers, microphones, cameras, keyboards, touch screens, mouses, tracks have come scanners, screens, or the like. Further, in some embodiments, content may be selected based on an attribute of the hardware of the user device 106 such as, for example, a screen size a screen resolution level, a screen color capability, or the like. The hardware configuration of the user device can be detected by the processing unit 504 of the user device 106 which detection can, for example, include detection of one or several drivers necessary for performance and/or a specific performance level of the hardware components.

After the hardware configuration has been identified, the process 700 proceeds to block 708 wherein a configuration signal is generated and sent. In some embodiments, the configuration signal can include information identifying the capabilities of the user device 106 including, for example, the hardware configuration the user device and the capabilities of the specific hardware components in the hardware configuration of the user device 106. In some embodiments, for example, the configuration signal can identify at least one hardware based capability of the user device 106, which at least one hardware based capability can include, for example, the ability of the user device 106 to record sound data via a microphone. In some embodiments, the configuration signal can identify at least one network capability of the user device 106 such as, for example, one or both of an upload speed and/or a download speed of the communicating connection with user device 106. The configuration signal can be generated and/or sent by the user device 106 and/or by the communications subsystem 532 of the user device 106 to the server 102. In some embodiments, the configuration signal can be generated and sent simultaneous with the generating and sending of the content receipt signal.

At block 710 one or several data packets are received by the user device 106 from the server 102. These data packets can be received in the form of one or several electrical signals and/or communications sent from the server 102 to the user device 106 via the communication network 120. These one or several data packets can be selected by the server 102, and specifically by a recommendation engine of the server 102 based, at least in part, on hardware configuration data received by the server 102 from the user device 106. In some embodiments, the hardware configuration data can identify at least one hardware based capability of the user device 106, and in some embodiments, the hardware configuration data can identify at least one hardware based capability and at least one of the upload speed and the download speed of the communication network 120.

In some embodiments, these one or several data packets can comprise presentation data and/or evaluation data. The presentation data can be data configured for presenting to the user of the user device and the evaluation data can be data configured for use in evaluating any received user response to the provided presentation data. In some embodiments, the evaluation data can include evaluation software, also referred to herein as evaluation code, and/or evaluation criteria, also referred to herein as evaluation data. In some embodiments, the evaluation software can be configured to, upon execution or implementation, automatically receive, retrieve, and/or evaluate a user response. In some embodiments, the evaluation software can be configured to evaluate a received response based on the evaluation criteria when the evaluation software is executed. In some embodiments, the evaluation data can comprise information used by the evaluation software to evaluate the received response. This information can include, for example, correct answer data. In some embodiments, the presentation data, evaluation code, an evaluation data can be simultaneously received, and in some embodiments, the presentation can be received with the data packet as indicated in block 710, the evaluation code can be received as indicated in block 712, and the evaluation data can be received as indicated in block 714. These one or several data packets including, for example, presentation data, evaluation code, and/or evaluation data, can be received by the communications subsystem 532 of the user device.

At block 716, the presentation data is provided to the user. In some embodiments, the presentation data can be provided to the user by the I/O subsystem 526 of the user device 106 according to instructions generated by the processing unit 504 of the user device 106. In some embodiments, this can include the generation of the user interface and the providing of the presentation data to the user via the user interface. At block 718, one or several responses are received by the user device 106 from the user. In some embodiments, this response can be specifically received via the I/O subsystem 526 of the user device 106. In some embodiments, the response can comprise a response to the presentation data provided to the user in block 716.

At block 720, the evaluation code and/or evaluation software received in block 712 is launched. In some embodiments, the evaluation software can be launched and/or executed by the processor units 504 of the user device. This launch of the evaluation software can include the execution of computer code and/or software received in block 712. After the evaluation software is launched, the process 700 proceeds to block 722 wherein the response received in block 718 is evaluated by the user device 106 and specifically by the processing units 504 of the user device 106. In some embodiments, the response received in block 718 can be evaluated by the evaluation software launched in block 720 according to the evaluation data received in block 714. In some embodiments, the evaluation the received response can include determining whether the response is a correct or incorrect response and/or the degree to which the response is a correct or incorrect response.

After the responses been evaluated, the process 700 proceeds to block 724 wherein outcome data is generated. In some embodiments, the outcome data can characterize the result of the evaluation performed in block 722. The outcome data can be generated according to the evaluation software received in block 712 in the evaluation received in block 714 by the user device 106 and specifically by the processing units 504.

After the outcome data has been generated, the process 700 proceeds to block 726 wherein an outcome data signal is generated and/or sent. In some embodiments, the outcome data signal can comprise one or several electrical signals or communications that can contain the outcome data. These one or several electrical communications and/or communications can be generated and/or sent by the user device 106 and specifically by the communications subsystem 532 of the user device 106. The outcome data signals can be sent from the user device 106 of the server 102 via the communication network 120.

At block 728 a response signal is received by the user device 106 from the server 102. In some embodiments, the response signal can acknowledge receipt of the outcome data signal by the server 102. After the response signal has been received, the process 700 proceeds to block 730 wherein it is determined whether to terminate the assessment. In some embodiments, this is determined based on whether termination request has been received by the user device 106 from the user. In some embodiments, a termination request can be generated by the user device 106 based on the attainment of one or several pre-determined termination criterion such as, for example, an amount of elapsed time, a number of received data packets, or the like. The termination request can be sent to, and/or be received by the server 102. If a termination request is not been received, then the process 700 can return to block 710 and continue as outlined above. In some embodiments, this can include the receipt of one or several additional data packet such as, for example, a second data packet which can include second presentation data, second evaluation software, and/or second evaluation data. In some embodiments, the second evaluation data can be selected based on, for example, one or several attributes of the received response and/or of the generated outcome data, and/or based on one or several attributes of the user device 106 such as, for example, the hardware configuration data and/or the identified hardware-based capabilities of user device 106. In some embodiments, the steps of block 710 through 730 can be repeatedly looped until a termination request is received. In some embodiments, and as the process 700 loops through block 710 through 730, data packets can be received by the user device 106 and block 710 that are selected based on previous performance of the user in responding to previously provided data packets.

Returning again to decision state 730, if it is determined that a termination request is received, then the process 700 proceeds to block 732 wherein the termination request is sent and/or delivered. In some embodiments, this can include the sending and/or delivering of the termination request from the user device 106 to the server 102 and specifically from the communication system 532 of the user device 106 to the server 102.

After the termination request has been delivered, the process 700 proceeds to block 734 wherein the user device receives aggregate outcome data. In some embodiments, the aggregate outcome data can comprise the aggregation of outcome data generated by the user device 106 and provided to the server 102. In some embodiments, the server 102 can aggregate outcome data as the user device loops through block 710 through 730 and repeatedly sends outcome data to the server 102. In addition to aggregating the outcome data, the server 102 can generate a score characterizing the aggregated outcome. This score can be delivered as part of the aggregated outcome data to the user device 106 and the user device 106 can then present the aggregated outcome data to the user via the I/O subsystem 526 of the user device 106.

Figure 9:
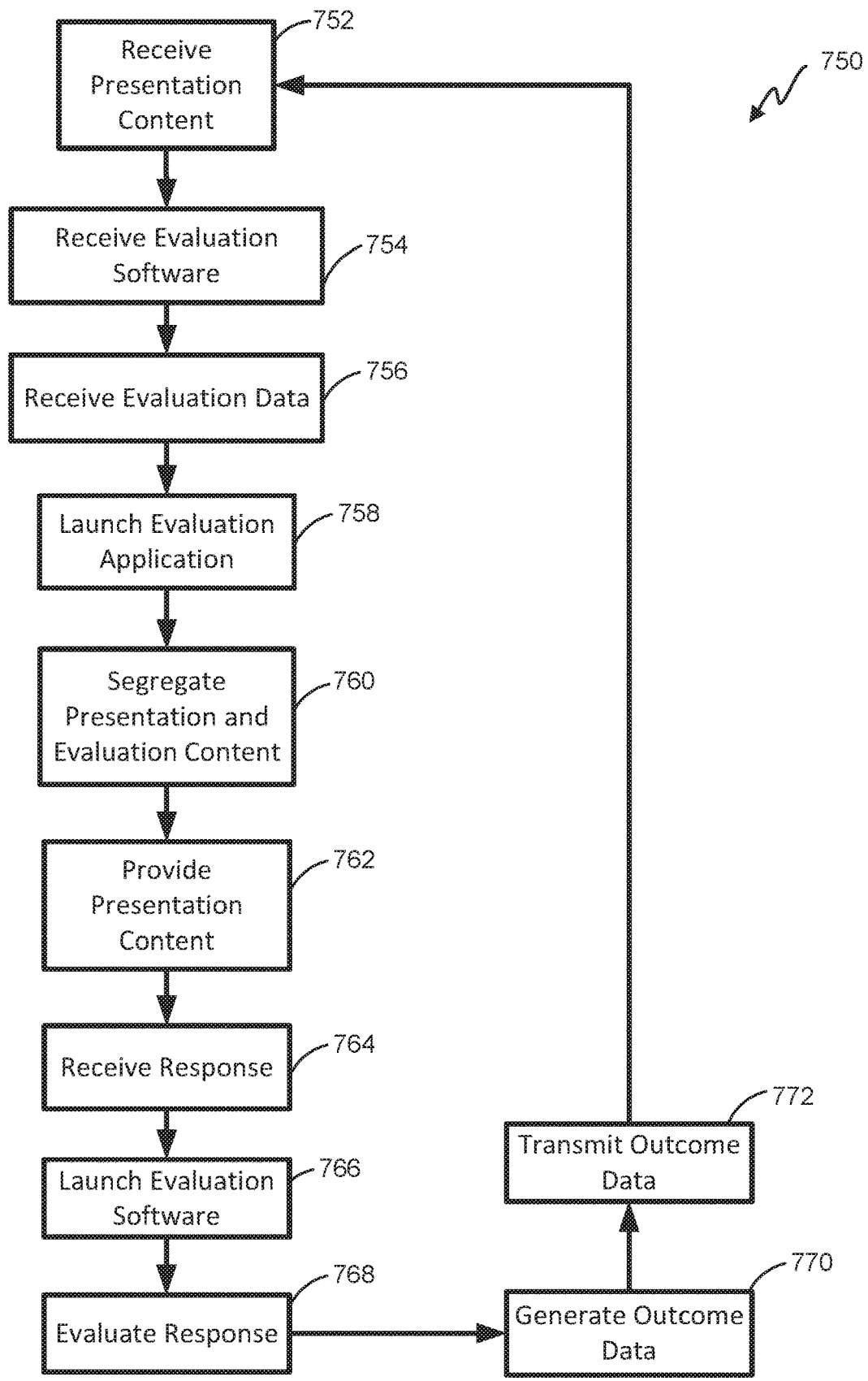
FIG. 9 is a flowchart illustrating one embodiment of a process for automated assessment scoring.

With reference now to FIG. 9, a flowchart illustrating one embodiment of a process 750 for automated assessment scoring is shown. The process 750 can be performed by all or portions of the content distribution network 100, including, for example, one or several of the user devices 106. The process 750 begins at block 752 wherein presentation data is received by the user device, and specifically by the communication subsystem 532 of the user device 106 from the server 102. The presentation data can include content for presenting to the user by the user device 106.

After the presentation data has been received, the process 750 proceeds to block 754 wherein evaluation software is received and then to block 756 wherein evaluation data is received. In some embodiments, the evaluation software and/or the evaluation data can be received simultaneous with the receipt of the presentation data, and in some embodiments, one or both of the evaluation software and the evaluation data can be received non-simultaneously with the receipt of the presentation data. In some embodiments, the presentation data, the evaluation software, and/or the evaluation data can be received by the user device 106 in an electronic communication from the server 102. In some embodiments, this electronic communication can contain the presentation data, the evaluation software, and/or the evaluation data in a data packet, and the communication can contain one or several data packets. In some embodiments, the electronic communication can include a first portion that can comprise the presentation data and the electronic communication can include a second portion that can comprise the evaluation content. In some embodiments, the first portion of the electronic communication can be received before the second portion of the electronic communication. The evaluation software and/or the evaluation data can be received by the user device 106 from the server 102 via, for example, the communications network 120.

After the evaluation data has been received, the process 750 proceeds to block 758 wherein the evaluation application is launched. In some embodiments, the evaluation application can comprise an application within which the evaluation software can be executed to thereby allow the evaluation application can comprise one or several foreground portions and one or several background portions. In some embodiments, the foreground portions can include a user interface that can deliver content to the user, and receive inputs from the user. In some embodiments, this user interface can be configured to provide the presentation data received in block 752 to the user. In some embodiments the one or several background portions can be secured from the one or several foreground portions such that the user cannot access the background portions and/or such that only approved data can flow between the foreground and background portions. In some embodiments, the evaluation application can include one or several features to facilitate the receipt of an evaluation software and/or evaluation code, and the execution thereof within the evaluation application. In some embodiments, the evaluation application can be launched by the user device 106 and specifically by one or more of the processing units 504 of the user device 106.

After the evaluation has been launched, the process 758 proceeds to block 760 wherein the presentation data is segregated from evaluation content which can include, for example, the evaluation software and/or the evaluation data. In some embodiments, the segregation of the presentation data from the evaluation data can include storing the evaluation content in a background database of the user device 106, which background database can be located in the storage subsystem 510 of the user device 106. In some embodiments, this background database is inaccessible to the user of the user device 106. In some embodiments, the segregation of the presentation content from the evaluation content can further include the encryption of the evaluation content before storage of the evaluation content in the background database. The presentation data can be segregated from the evaluation content by the user device 106 and specifically by the processing unit 504 of the user device.

After the presentation content has been segregated from the evaluation content, the process 750 proceeds to block 762, wherein the presentation content is provided to the user. In some embodiments, this can include the providing of the presentation content to the user via the foreground portions of the evaluation application, and specifically via the user interface of the foreground portions of the evaluation application. In some embodiments, these foreground portions of the evaluation application can operate with and/or within the I/O subsystem 526 of the user device 106. In some embodiments, the presentation content can be provided to the user before the receipt of some or all of the evaluation content by the user device 106 from the server 102.

After the presentation content has been provided to the user, the process 750 proceeds to block 764, wherein a response is received. In some embodiments, the response can be received by the user device 106 from the user, and specifically can be received by the user device 106 via the I/O subsystem 526 from the user. After the response has been received, the process 750 proceeds to block 766, wherein the evaluation software is launched. In some embodiments, the evaluation software can be automatically launched as a result of the receipt of the response in block 764. In some embodiments, for example, the receipt of the response in block 764 can trigger the launch of the evaluation software within the evaluation application.

After the evaluation software has been launched, the process 750 proceeds to block 768, wherein the received response is evaluated. The received response can be evaluated in the background of the evaluation application by the evaluation content and specifically by the evaluation software according to the evaluation data. As a part of the evaluation, and as indicated at block 770 of the process 750, outcome data can be generated and/or outputted by the evaluation application. In some embodiments, the outcome data can be automatically generated for the received response by the evaluation application with the evaluation content, and the outcome data can characterize at least one user attribute based on the received response such as, for example, whether the response was a correct response or incorrect response, the degree to which the response was a correct response or an incorrect response, a user skill level calculated based on the outcome data, or the like.

After the outcome data has been generated, the process 750 proceeds to block 772, wherein the outcome data is transmitted to the server 102. In some embodiments, this can include generation of one or several electrical signals comprising the outcome data and/or the generation of one or several communications comprising the outcome data as payload, and sending these one or several electrical signals and/or communications to the server 102. In some embodiments, the outcome data can be sent to the server 102 from the user device 106, and specifically from the communications subsystem 532 via the communication network 120. In some embodiments, the outcome data can be automatically transmitted to the server 102 upon the completed generation of the outcome data. After the outcome data has been transmitted, the process 750 can return to block 752, wherein next presentation content can be received. In some embodiments, this next presentation content can be selected by the server according to one or several attributes of the user including any changes to those one or several attributes of the user caused by the transmitted outcome data such as user's preference for content format or user's estimated ability level on one or more attributes. In some embodiments, this next presentation content can be selected by a recommendation engine of the server 102.

In some embodiments, this selected next content can comprise interventional and/or remedial content. This interventional and/or remedial content can be selected by the server 102 and specifically by the recommendation engine of the server 102 to resolve a misunderstanding demonstrated by the user from whom the response was received and/or to fill a knowledge gap demonstrated by the user from whom the response was received. In some embodiments, the selected next content can be selected to improve user metadata for the user from whom the response was received. In some embodiments, for example, a user's skill level and/or mastery of one or several topics or skills may be insufficiently defined. In such an embodiment, the selected next content can comprise content having similar metadata to previously presented content and/or is associated with a same or a similar learning objective as previously presented content. In such an embodiment, response to the selected next content can provide additional data that can be used to improve the definition of the user's skill level and/or mastery of one or several topics or skills.

Figure 10:
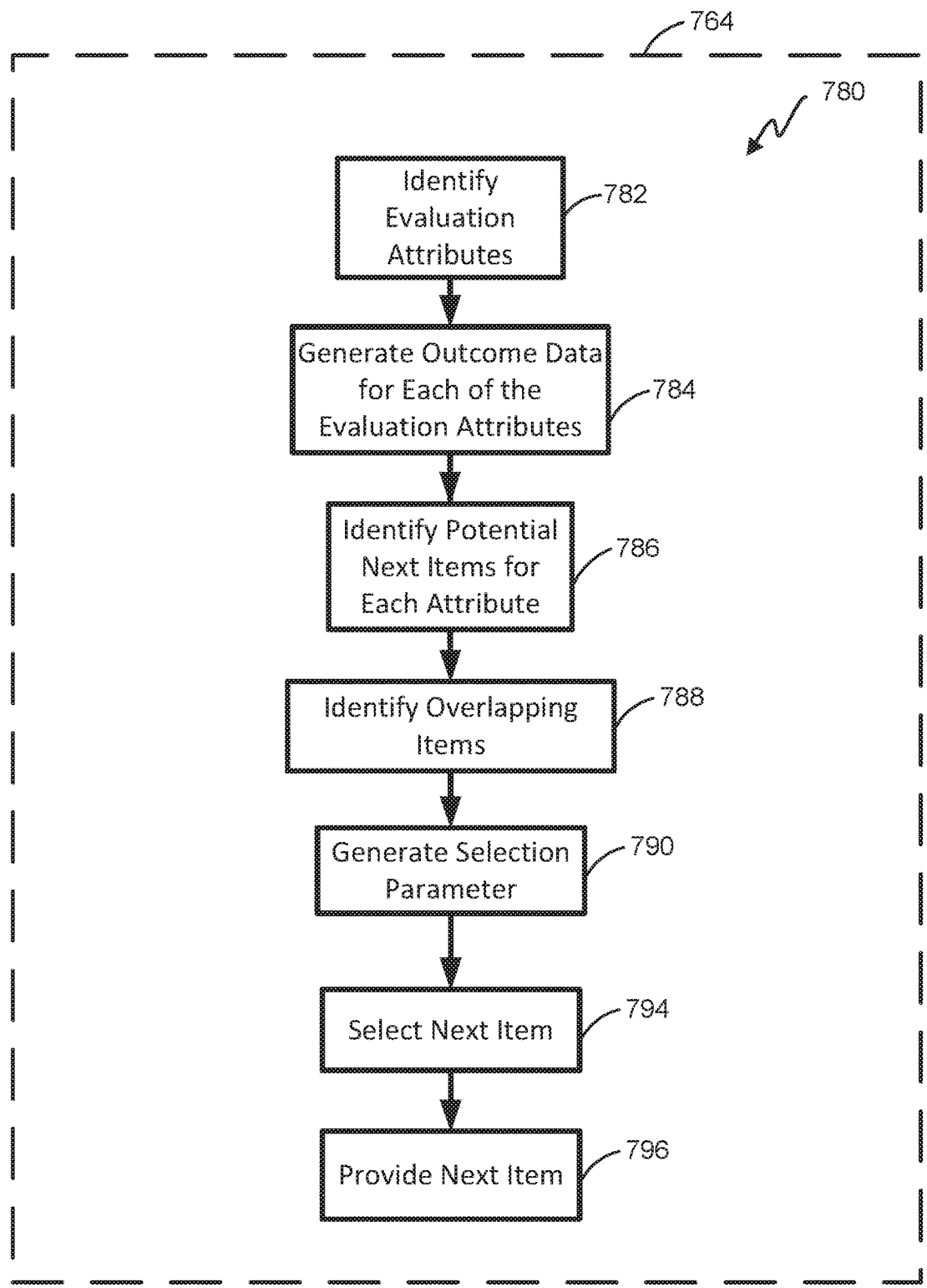
FIG. 10 is a illustrating one embodiment of a process for data packet selection.

With reference now to FIG. 10, a flowchart illustrating one embodiment of a process 780 for data packet selection is shown. The process 780 can be performed by all or portions of the content distribution network 100, and in some embodiments, the process 780 can be performed by the user device 106 and/or the server 102. In some embodiments, the process 780 can be performed as a part of, simultaneous with, or in the place of the step of block 764 of FIG. 9. In some embodiments, the process 780 can be performed simultaneous with steps 764 through 772 of FIG. 9. The process 780 begins at block 782, wherein one or several evaluation attributes are identified. In some embodiments, for example, a response can be characterized by each of a plurality of attributes. In some embodiments, some or all of the plurality of attributes can be independent of each other. In some embodiments, these attributes can include, for example a parameter and/or value characterizing pronunciation, clarity, fluency, cohesiveness of thought, organization, vocabulary, tempo, tone, voice, or the like. In some embodiments, information identifying these attributes can be stored in the database server 104, and specifically within the evaluation database 308. In some embodiments, the database server 104, and specifically the evaluation database 308 can further include information relating to the generation outcome data for some or all of the plurality of attributes and specifically including code or software, that when executed, generates outcome data for some or all of the attributes from a received response. In some embodiments, the identifying of these evaluation attributes can include the retrieval of information identifying these attributes from the database server 104, and specifically from the evaluation database 308.

After evaluation attributes have been identified, the process 780 proceeds to block 784, wherein outcome data for some or all of the evaluation attributes are generated. In some embodiments, this can include the execution, by the server 102, of code or software retrieved from the evaluation database. In some embodiments, the execution of this code or software can cause the generation of the outcome data for each of the evaluation attributes. The software or code can be executed by the response system 406 of the server 102 to generate the outcome data.

After the outcome data has been generated, the process 780 proceeds to block 786, wherein potential next items are identified for some or all of the attributes for which the outcome data was generated. In some embodiments, for example, as the attributes can be independent, potential next items for some or all of the attributes are non-identical. In some embodiments, the potential next items can be selected to match a skill level of each of the some or all of the attributes. In some embodiments, for example, a user can have a first skill level associated with pronunciation and a second skill level associated with fluency. Based on the first skill level, one or several first potential next items can be selected which have a difficulty that corresponds to the first skill level. Similarly, based on the second skill level, one or several second potential next items can be selected which have a difficulty that corresponds to the second skill level. In some embodiments, the potential next items can be identified by the packet selection system 402 and/or the recommendation engine.

After the potential next items have been identified, the process 780 proceeds to block 788, wherein one or several overlapping items are identified. In some embodiments, this can include identifying one or several of the potential next items that are identified as potential next items based on more than one attribute. The identifying of the overlapping items can, in some embodiments, be performed by the server 102, and specifically by the packet selection system 402 of the server 102.

After the overlapping items have been generated, the process 780 proceeds to block 790, wherein a selection parameter is generated. In some embodiments, the selection parameter can facilitate to rank overlapping items to allow selection of the best next item from the overlapping items. In some embodiments, for example, the selection parameter can be at least partially based on the quantification of the degree to which some or all of the overlapping potential next items overlap. In some embodiments, this quantification can include identifying the number of attributes for which a potential next item was identified as a potential next item and ranking overlapping potential next items according to this number of attributes for which a potential next item was identified as a potential next item. In some embodiments, the selection parameter can be based, at least in part, on a weight associated with some or all of the attributes. In some embodiments, for example, one or several of the parameters can have a higher weighting than others of the one or several parameters such that potential next items associated with the higher weighted one or several next parameters are more likely to be selected. In some embodiments, for example, the selection parameter can include a combination of the quantification of the degree of overlapping and the weighting. The selection parameter can be generated by the server 102, and specifically by the packet selection system 402 of the server 102.

After the selection parameter has been generated, the process 780 proceeds to block 794, wherein a next item is selected. In some embodiments, the next item can be selected from the one or several overlapping items. In some embodiments, the next item can be selected from the one or several overlapping items based on, for example, the selection parameter. In some embodiments, an item can be selected as the next item when the item has a selection parameter that identifies the item as the best next item from the set of overlapping items. In some embodiments, the next item can be selected by the packet selection system 402 of the server 102.

After the next item is selected, the process 780 proceeds to block 796, wherein the next item is provided. In some embodiments, the next item can be provided from the server 102 to the user device 106 via, for example, the communication network 120. After the next item has been provided, the process 780 can proceed to step 752 of FIG. 9.

Figure 11:
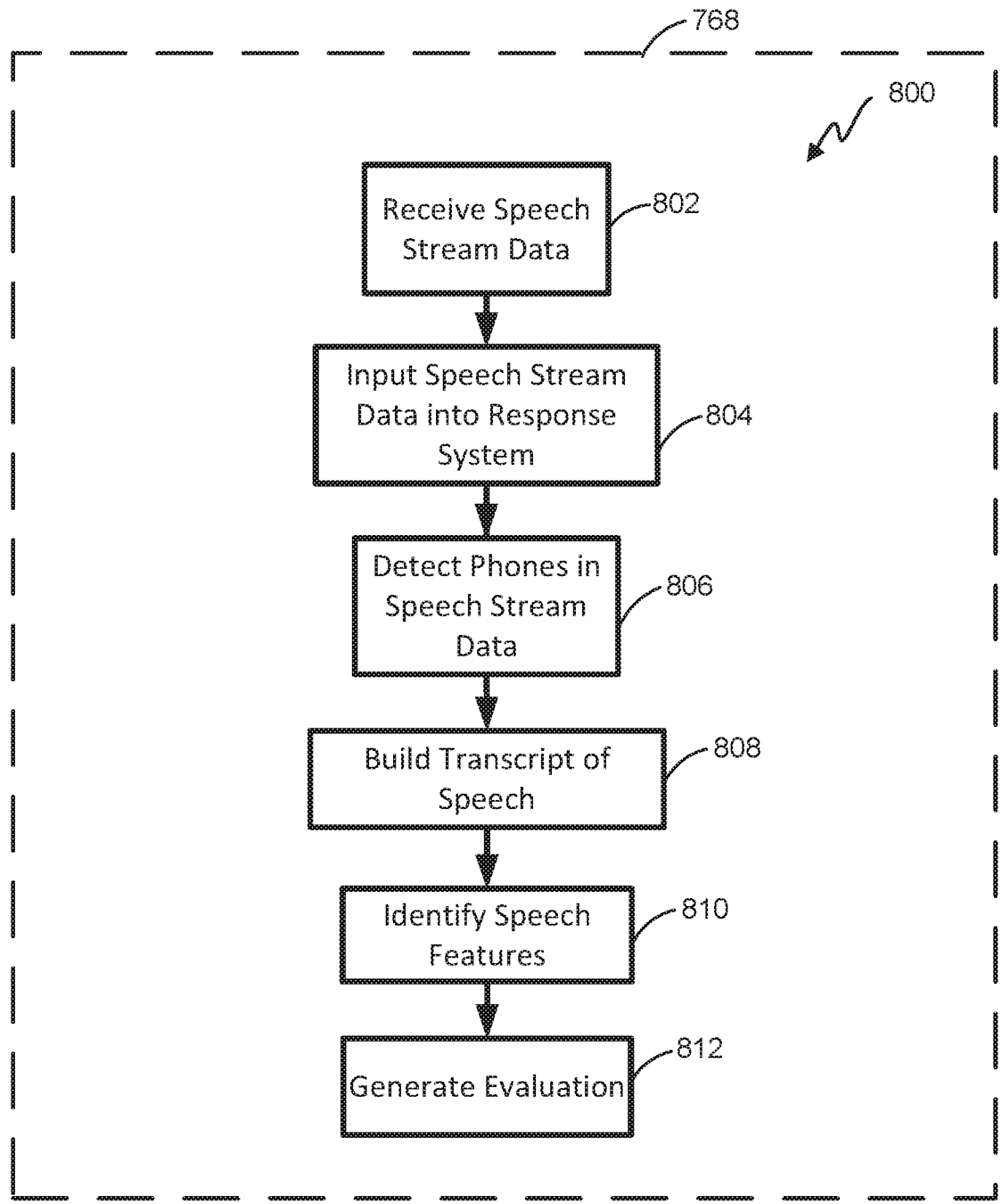
FIG. 11 is a flowchart illustrating one embodiment of a process for evaluating a response.

With reference now to FIG. 11, a flowchart illustrating one embodiment of a process 800 for evaluating a response is shown. In some embodiments, the process 800 can be performed as a part of, or in the place of block 768 of FIG. 9. The process 800 can be performed by, in some embodiments, the user device 106, and specifically by the processing unites 504 of the user device 106, which can, for example, execute the evaluation software within the evaluation application. In some embodiments, the process 800 can be performed when the received response comprises speech data which can be, for example a stream of speech data.

The process 800 begins at block 802, wherein speech stream data is received. In some embodiments, the speech stream data can comprise data corresponding to a recording of a user provided input such as, for example, user speech. The speech stream data can be generated at the user device 106 by the user device 106, and specifically by the I/O subsystem 526 of the user device 106. In some embodiments, the I/O subsystem 526 can include a microphone which can convert sounds into electrical signals. In some embodiments, the speech stream data can comprise electrical signals generated by the microphone of the I/O subsystem 526.

After the speech stream data is received, the process 800 proceeds to block 804, wherein the speech stream data is inputted into a response system 406, which can, in some embodiments, be located in the user device 106. In some embodiments, the response system 406 can comprise natural language processing capability and/or natural language processing software. This can include, for example, speech recognition software and/or natural language understanding software. In some embodiments, the response system 406 can apply this natural language processing capability to the speech stream data to evaluate the received speech stream data. In some embodiments, the response system 406 can receive the speech stream data from the I/O subsystem 526.

After the speech stream data has been received by the response system 406, the process 800 proceeds to block 806, wherein phones are identified in the speech stream data. In some embodiments, this can include identifying one or several distinct sounds within the speech stream. The user device 106, and specifically the response system 406 can use natural language processing capability to identify phones within the speech stream data. After the phones have been recognized, the process 800 proceeds to block 808, wherein a transcript of speech is generated. In some embodiments, this can be performed via a speech-to-text algorithm or protocol that forms part of the natural language processing capability of the user device 106 and/or of the response system 406 of the user device 106. In some embodiments, the transcript of speech can be generated based on the phones identified in block 806.

After the transcript has been generated and/or built, the process 800 proceeds to block 810, wherein one or several speech features are identified within the transcript. In some embodiments, this can include the evaluating of the transcript, which evaluating can include the parsing of the transcript, the identifying of one or several parts of speech, identifying one or several words, grammars, or the like. In some embodiments, the speech features relate to pronunciation, clarity, fluency, cohesiveness of thought, organization, vocabulary, tempo, tone, voice, or the like. After the speech features are identified, the process 800 proceeds to block 812, wherein an evaluation of the speech stream data is generated. In some embodiments, the generation of the evaluation of the speech stream data can include the application of a scoring model to the transcript and/or to the features identified from within the transcript. In some embodiments, the evaluation of the speech stream data can be generated based on the identified features by the user device 106, and specifically by the response system 406 of the user device 106. After the evaluation has been generated, the process 800 proceeds to block 770 and continues as outlined above. In some embodiments, the outcome data generated in block 770 can comprise the output of the scoring model.

Figure 12:
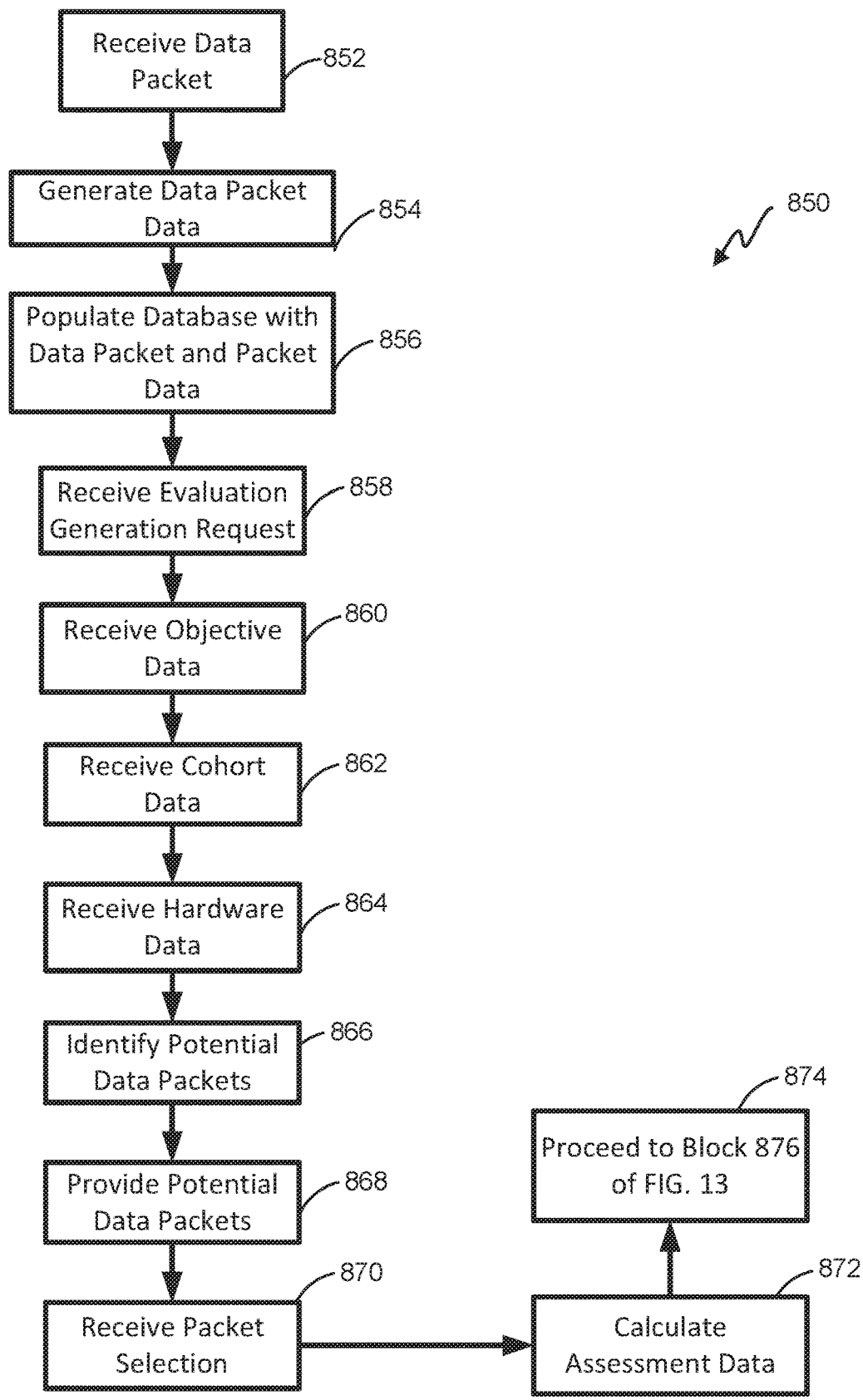
FIG. 12 is first portion of a flowchart illustrating one embodiment of a process for automatic assessment generation.
Figure 13:
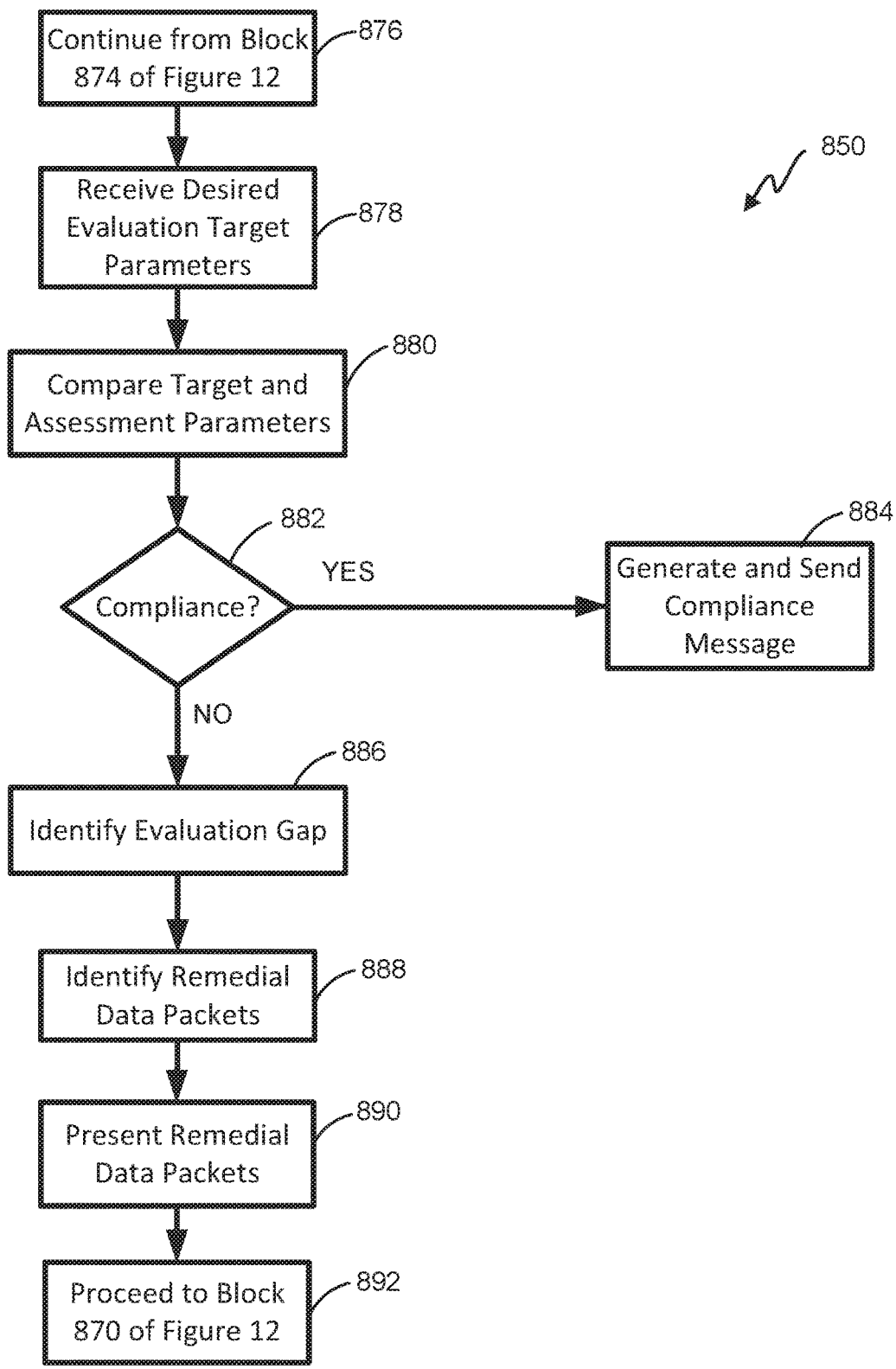
FIG. 13 is a second portion of the flowchart illustrating one embodiment of a process for automatic assessment generation.

With reference now to FIGS. 12 and 13, a flowchart illustrating one embodiment of a process 850 for automatic assessment generation, also referred to herein as automatic evaluation generation is shown. The process 850 can be performed by the all or portions of the content distribution network 100, and specifically can be performed by the server 102. The process 850 begins at block 852, wherein one or several data packets are received. In some embodiments, one or several data packets can be one or several newly generated data packets and/or one or several data packets that can be received from the database server 104 and specifically from the content library database 103. After the one or several data packets have been received, the process 850 proceeds block 854 wherein data packet data is generated for the received one or several data packets. In some embodiments, the data packet data, also referred to herein as data packet metadata can characterize one or several attributes of the data packets received in block 852 of FIG. 12. These attributes can include, for example, difficulty, which difficulty can relate to the data packet as a whole and/or to one or several aspects of the data packet. In some embodiments, these attributes can include a difficulty level relating to one or several attributes of the data packet such as, for example, a difficulty level of some or all of: grammar; organization; content; word choice, or the like. These one or several attributes of the data packet can be generated by the server 102.

After the data packets data is generated, the process 850 proceeds to block 856, wherein a database of the database server 104 is populated with the data packet and data packet data. In some embodiments, this can include the inputting of the data packet and/or the data packet data into the database server 104, and specifically into the content library database 303. The process 850 proceeds to block 858, wherein an evaluation generation request is received. In some embodiments, the evaluation generation request can be received by the server 102 from the user device 106 and/or the supervisor device 110. The evaluation generation request can be received by the server 102 from the user device 106 and/or the supervisor device 110 via the communications network 120.

After the evaluation generation request is received, the process 850 proceeds to block 860, wherein objective data is received. In some embodiments, the objective data can identify, for example, an objective, also referred to herein as an outcome, to be evaluated by the assessment generated by process 850. In some embodiments, this objective can correspond to, for example, an educational or learning objective. The objective data can be received by the server 102 from the user device 106 and/or the supervisor device 110.

After the objective data has been received, the process 850 proceeds to block 862, wherein cohort data is received. In some embodiments, the cohort data can identify the cohort for whom the assessment generated in process 850 is intended. In some embodiments, the cohort data can include identify one or several users within the cohort, and/or in some embodiments, the cohort can include user metadata identifying one or several attributes of users within the cohort. In some embodiments, this can be received from the database server 104 based on information contained in the evaluation generation request received in block 858. In some embodiments, the cohort data can identify a group of users such as, for example, a class, as the cohort.

After the cohort data has been received, the process 850 proceeds to block 864, wherein hardware data is received. In some embodiments, the hardware data can comprise configuration data that can identify at least one hardware based capability of the user devices 106 of users in the cohort. In some embodiments, this configuration data can identify the hardware capabilities and/or components of user devices 106 of the users in the cohort. This configuration data can be received by the server 102 from the user devices 106 in response to a request for such configuration data, and/or the configuration data can be retrieved from the database server 104, and specifically from the user profile database 301 of the database server 104.

After the cohort data has been received, the process 850 proceeds to bock 866, wherein one or several potential data packets are identified. In some embodiments, this can include identifying one or several potential data packets relating to the objective identified by the objective data received in block 860. In some embodiments, the potential data packets can be further selected based on the hardware data received in block 864 such that hardware requirements of the selected potential data packets are met by the hardware configuration of user devices of users in the cohort identified in block 862. The one or several potential data packets can be identified by the server from the data packets contained in the database server 104, and specifically within the content library database 303 of the database server 104. In some embodiments, the potential data packets can be identified by a query of the content library database 303 for data packets relating to the objective associated with the objective data received in block 860.

After the potential data packets have been identified, the process 850 proceeds to block 868, wherein the potential data packets are provided. In some embodiments, the potential data packets can be provided to the user who provided the evaluation generation request received in block 858. In some embodiments, the providing of the potential data packets can include transmitting the potential data packets from the server 102 to a device used by the user who provided the evaluation generation request. In some embodiments, the potential data packets can be transmitted from the server 102 to the user device 106 and/or the supervisor device 110 via, for example, the communication network 120. The user device 106 and/or the supervisor device 110 can provide the potential data packets to the user via, for example, the I/O subsystem of the user device 106 and/or the supervisor device 110.

After the potential data packets have been provided, the process 850 proceeds to block 870, wherein one or several packet selections are received. In some embodiments, the one or several packet selections can identify one or several data packets for inclusion in the assessment. The one or several packet selections can be received by the server 102 from the user device 106 and/or the supervisor device 110. After the packet selections have been received, the process 850 proceeds to block 872, wherein assessment data is calculated. In some embodiments, the assessment data can characterize one or several attributes of the assessment such as, for example, the difficulty of the assessment. In some embodiments, assessment data can be calculated based on metadata associated with individual data packets selected for inclusion in the assessment. In some embodiments, for example, the server 102 can retrieve metadata for data packets selected for inclusion in the assessment. Data relevant to one or several desired attributes can be identified in the metadata for data packets selected for inclusion in the assessment, and this data can be extracted from the metadata and combine with similar data from other data packets selected for inclusion in the assessment to determine, generate, and/or calculate assessment data. The assessment data can be determined, generated, and/or calculated by the server 102.

After the assessment data has been calculated, the process 850 continues to block 874 and then proceeds to block 876 of FIG. 13. From block 876, the process 850 proceeds to block 878 of FIG. 13, wherein one or several desired evaluation target parameters are received. In some embodiments, these one or several desired evaluation target parameters can specify one or several desired attributes of the evaluation, such as, for example, a desired difficulty level of the evaluation. In some embodiments, the desired evaluation target parameters can be received by the server 102 from the user directing the generation of the evaluation via the user device 106 and/or the supervisor device 110.

After the desired evaluation target parameters have been received, the process 850 proceeds to block 880 wherein the desired evaluation target parameters are compared to the assessment data calculated in block 872. In some embodiments, the comparison can be performed by the server 102. After the comparing of the target and assessment parameters, the process 850 proceeds to decision state 882, wherein it is determined whether the assessment data calculated in block 872 complies with and/or meets the desired evaluation target parameters received in block 878. This determination can be made based on the result of the comparison of these parameters in block 880, and this determination can be made by the processor 102. If it is determined that the assessment data calculated in block 872 complies with and/or meets the desired evaluation target parameters received in block 878, then the process 850 proceeds to block 884, wherein compliance message is generated and sent. In some embodiments, this compliance message can be generated by the server 102 and can be sent to the user device 106 and/or the supervisor device 110. In some embodiments, the compliance message can be sent in the form of an alert that can comprise code that can automatically trigger the launching of the user interface of the receiving device, including the user device 106 and/or the supervisor device 110. In some embodiments, this user interface can automatically display all or portions of the compliance message such as, for example, message indicating the compliance of the calculated assessment data with the desired evaluation target parameters.

Returning again to decision state 882, if it is determined that the calculated assessment data does not comply with and/or does not match with the desired evaluation target parameters received in block 878, then the process 850 proceeds to block 886, wherein an evaluation gap is identified. In some embodiments, this evaluation gap can characterize the discrepancy between the desired evaluation target parameters received in block 878 and the assessment data calculated in block 872. The evaluation gap be identified based off of the comparison performed in block 880, and can be identified by the server 102.

After the evaluation gap has been identified, the process 850 proceeds to block 888, wherein one or several remedial data packets are identified. In some embodiments, this can include identifying one or several data packets from the potential data packets identified in block 866, that could, via inclusion in the assessment, eliminate and/or mitigate the evaluation gap. In some embodiments, this can include the determining of data packet data associated with those potential data packets, and the effect of the inclusion of one or several of those potential data packets in the assessment on the assessment data. In some embodiments, one or several of the potential data packets can be identified as remedial data packets based on the degree to which they eliminate and/or mitigate the evaluation gap. These one or several remedial data packets can be identified by the server 102.

After remedial data packets have been identified, the process 850 proceeds to block 890, wherein the identified remedial data packets are presented. In some embodiments, the remedial data packets can be presented to the user directing the generation of the evaluation via the user device 106 and/or the supervisor device 110. In some embodiments, these one or several identified remedial data packets can be sent to the user with a request for the user to select one or several for inclusion in the assessment. In some embodiments, the one or several remedial data packets can, upon receipt by the user device 106 and/or the supervisor device 110 be automatically displayed to the user via a user interface controlled by the I/O subsystem 526 of the user device 106 and/or the supervisor device 110. The one or several remedial data packets can be sent by the server 102 to the user via the user device and/or supervisor device 110. After the one or several remedial data packets have been sent to the user, the process 850 can proceed to block 892 and can return to block 870 of FIG. 12 and proceed as outlined above.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for automated assessment generation, the system comprising:
   a memory comprising:
   a user profile database comprising user metadata relating to a plurality of users, wherein the user metadata relating to the plurality of users identifies attributes of the plurality of users; and
   a content library database comprising a plurality of data packets for providing to a user;
   a user device; and
   at least one server, the at least one server configured to:
      receive an evaluation generation request from the user device for generation of an evaluation;
      identify a cohort for recipient of the evaluation, wherein the cohort comprises a plurality of users;
      retrieve user metadata from the memory;
      identify a hardware configuration of user devices associated with the plurality of users in the cohort;
      identify potential data packets based on information received in the evaluation generation request and on the identified hardware configuration of user devices associated with the plurality of users in the cohort;
      receive a selection of data packets for inclusion in the assessment from the identified potential data packets;
      identify data related to at least one desired attribute in metadata associated with the data packets selected for inclusion in the assessment;
      extract the identified data related to the at least one desired attribute from the metadata associated with each data packet in the data packets selected for inclusion in the assessment;
      calculate assessment data from a combination of the extracted data for each data packet from the metadata associated with the data packets selected for inclusion in the assessment;
      determine that the assessment does not meet at least one target parameter; and
      receive a selection of at least one remedial data packet for inclusion in the assessment.

2. The system of claim 1, wherein determining that the assessment does not meet at least one target parameter comprises:
   receiving at least one desired target parameter; and
   comparing the assessment data to the at least one desired target parameter.

3. The system of claim 2, wherein determining that the assessment does not meet at least one target parameter comprises identifying an evaluation gap based on the comparing of the assessment data to the at least one desired target parameter.

4. The system of claim 3, wherein the at least one server is further configured to identify at least one remedial data packet and provide the at least one remedial data packet to the user device.

5. The system of claim 4, wherein the at least one remedial data packet is identified based on the evaluation gap.

6. The system of claim 4, wherein the at least one remedial data packet is identified based on the ability of the at least one remedial data packet to eliminate the evaluation gap via inclusion in the assessment.

7. The system of claim 4, wherein the at least one server is further configured to:
   re-calculate assessment data after the selection of the at least one remedial data packet for inclusion in the assessment;
   compare the recalculated assessment data to at least one target parameter; and
   determine that the recalculated assessment data meets the at least one target parameter.

8. The system of claim 7, wherein the at least one server is further configured to generate and send a compliance message indicating that the recalculated assessment data meets the at least one target parameter.

9. The system of claim 1, wherein identifying a hardware configuration comprises receiving hardware configuration data, the hardware configuration data identifying at least one hardware based capability and at least one network capability of the user devices associated with the plurality of users in the cohort.

10. A method for automated assessment generation, the method comprising:
   receiving at at least one server an evaluation generation request from a user device for generation of an evaluation;
   identifying at the at least one server a cohort for recipient of the evaluation, wherein the cohort comprises a plurality of users;

retrieving at the at least one server user metadata from a memory;

identifying at the at least one server a hardware configuration of user devices associated with the plurality of users in the cohort;

identifying at the at least one server at least one potential data packets based on information received in the evaluation generation request and on the identified hardware configuration of user devices associated with the plurality of users in the cohort;

receiving a selection of data packets for inclusion in the assessment from the at least one identified potential data packets;

identifying data related to at least one desired attribute in metadata associated with the data packets selected for inclusion in the assessment;

extracting the identified data related to the at least one desired attribute from the metadata associated with each data packet in the data packets selected for inclusion in the assessment;

calculating assessment data from a combination of the extracted data for each data packet from the metadata associated with the data packets selected for inclusion in the assessment;

determining that the assessment does not meet at least one target parameter; and receiving a selection of at least one remedial data packet for inclusion in the assessment.

11. The method of claim 10, wherein determining that the assessment does not meet at least one target parameter comprises:

receiving at least one desired target parameter; and comparing the assessment data to the at least one desired target parameter.

12. The method of claim 11, wherein determining that the assessment does not meet at least one target parameter comprises identifying an evaluation gap based on the comparing of the assessment data to the at least one desired target parameter.

13. The method of claim 12, further comprising identifying at least one remedial data packet and providing the at least one remedial data packet to the user device.

14. The method of claim 13, wherein the at least one remedial data packet is identified based on the evaluation gap.

15. The method of claim 13, wherein the at least one remedial data packet is identified based on the ability of the at least one remedial data packet to eliminate the evaluation gap via inclusion in the assessment.

16. The method of claim 13, further comprising:

re-calculating assessment data after the selection of the at least one remedial data packet for inclusion in the assessment;

comparing the recalculated assessment data to at least one target parameter; and determining that the recalculated assessment data meets the at least one target parameter.

17. The method of claim 16, further comprising generating and sending a compliance message indicating that the recalculated assessment data meets the at least one target parameter.

18. The method of claim 10, wherein identifying a hardware configuration comprises receiving hardware configuration data, the hardware configuration data identifying at least one hardware based capability and at least one network capability of the user devices associated with the plurality of users in the cohort.

* * * * *